US012803641B2

(12) United States Patent
Myung et al.

(10) Patent No.: US 12,803,641 B2
(45) Date of Patent: Nov. 17, 2026

(54) METHOD FOR CARRYING OUT CHANNEL ACCESS PROCEDURE AND DEVICE THEREFOR

(71) Applicant: LG ELECTRONICS INC., Seoul (KR)

(72) Inventors: Sechang Myung, Seoul (KR); Suckchel Yang, Seoul (KR); Seonwook Kim, Seoul (KR); Seongwon Go, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 173 days.

(21) Appl. No.: 18/696,873

(22) PCT Filed: Sep. 29, 2022

(86) PCT No.: PCT/KR2022/014620

§ 371 (c)(1),
(2) Date: Mar. 28, 2024

(87) PCT Pub. No.: WO2023/055105

PCT Pub. Date: Apr. 6, 2023

(65) Prior Publication Data

US 2024/0429992 A1 Dec. 26, 2024

Related U.S. Application Data

(60) Provisional application No. 63/276,507, filed on Nov. 5, 2021.

(30) Foreign Application Priority Data

Sep. 30, 2021 (KR) ........................ 10-2021-0130365
Nov. 3, 2021 (KR) ........................ 10-2021-0149883

(51) Int. Cl.
*H04B 7/06* (2006.01)
*H04W 72/044* (2023.01)

(52) U.S. Cl.
CPC ...... *H04B 7/06952* (2023.05); *H04W 72/046* (2013.01)

(58) Field of Classification Search
None
See application file for complete search history.

(56) References Cited

U.S. PATENT DOCUMENTS

2020/0236555 A1 7/2020 Tomeba et al.
2020/0413268 A1 12/2020 Yerramalli et al.
2024/0057162 A1* 2/2024 Park .................. H04B 7/06952

FOREIGN PATENT DOCUMENTS

KR 1020200038240 4/2020
KR 1020210057120 5/2021
WO 2021181282 9/2021

OTHER PUBLICATIONS

PCT International Application No. PCT/KR2022/014620, International Search Report dated Jan. 20, 2023, 6 pages.

* cited by examiner

*Primary Examiner* — Walter J DiVito
(74) *Attorney, Agent, or Firm* — LEE, HONG, DEGERMAN, KANG & WAIMEY

(57) ABSTRACT

The present disclosure discloses a method for a terminal transmitting an uplink signal in a wireless communication system. Particularly, the method comprises: receiving information related to a downlink reference signal associated with an uplink signal; on the basis of the information, determining a sensing beam and a transmission beam for the uplink signal; carrying out sensing for the sensing beam; and, on the basis that a channel corresponding to the sensing beam is IDLE, transmitting the uplink signal through the transmission beam.

12 Claims, 22 Drawing Sheets

(a) Carrier aggregation between L-band and U-band (b) Standalone U-band(s)

(a) Uplink Tx procedure based on dynamic grant (b) Uplink Tx procedure based on configured grant (a)

(b)

(a) (b)

METHOD FOR CARRYING OUT CHANNEL ACCESS PROCEDURE AND DEVICE THEREFOR

CROSS-REFERENCE TO RELATED APPLICATION(S)

This application is the National Stage filing under 35 U.S.C. 371 of International Application No. PCT/KR2022/014620, filed on Sep. 29, 2022, which claims the benefit of earlier filing date and right of priority to Korean Application No(s). 10-2021-0130365, filed on Sep. 30, 2021, and 10-2021-0149883, filed on Nov. 3, 2021, and also claims the benefit of U.S. Provisional Application No(s). 63/276,507, filed on Nov. 5, 2021, the contents of which are all incorporated by reference herein in their entirety.

The present disclosure relates to a method of performing a channel access procedure and an apparatus therefor, and more particularly, to a method of determining a sensing beam for sensing a channel and/or a transmission (Tx) beam and an apparatus therefor.

BACKGROUND

As more and more communication devices demand larger communication traffic along with the current trends, a future-generation 5th generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra-high reliability, ultra-low latency, and ultra-high availability (e.g., vehicle to everything (V2X), emergency service, and remote control), and mMTC is a future-generation mobile communication scenario characterized by low cost, low energy, short packet, and massive connectivity (e.g., Internet of things (IoT)).

SUMMARY

The present disclosure provides a method of performing a channel access procedure and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

According to an embodiment of the present disclosure, a method of transmitting an uplink signal by a user equipment (UE) in a wireless communication system include receiving information about a downlink reference signal related to the uplink signal, determining a transmission beam and a sensing beam for the uplink signal based on the information, performing sensing on the sensing beam, and based on a channel, corresponding to the sensing beam, being idle, transmitting the uplink signal via the transmission beam.

The information may be used for configuration a spatial relation between the downlink reference signal and the uplink signal.

The information may include a unified transmission configuration indicator (TCI) framework.

The determining of the sensing beam may include determining an uplink reference signal used for listen-before-talk (LBT) based on the information, and determining the sensing beam based on the uplink reference signal.

The UE may have no beam correspondence.

The sensing beam may cover the transmission beam.

According to an embodiment of the present disclosure, a user equipment (UE) for transmitting an uplink signal in a wireless communication system includes at least one transceiver, at least one processor, and at least one computer memory operatively connected to the at least one processor and configured to store instructions that when executed causes the at least one processor to perform operations including receiving information about a downlink reference signal related to the uplink signal through the at least one transceiver, determining a transmission beam and a sensing beam for the uplink signal based on the information, performing sensing on the sensing beam, and based on a channel, corresponding to the sensing beam, being idle, transmitting the uplink signal via the transmission beam through the at least one transceiver.

The information may be used for configuration a spatial relation between the downlink reference signal and the uplink signal.

The information may include a unified transmission configuration indicator (TCI) framework.

The determining of the sensing beam may include determining an uplink reference signal used for listen-before-talk (LBT) based on the information, and determining the sensing beam based on the uplink reference signal.

The UE may have no beam correspondence.

The sensing beam may cover the transmission beam.

According to an embodiment of the present disclosure, an apparatus for transmitting an uplink signal in a wireless communication system includes at least one processor, and at least one computer memory operatively connected to the at least one processor and configured to store instructions that when executed causes the at least one processor to perform operations including receiving information about a downlink reference signal related to the uplink signal, determining a transmission beam and a sensing beam for the uplink signal based on the information, performing sensing on the sensing beam, and based on a channel, corresponding to the sensing beam, being idle, transmitting the uplink signal via the transmission beam.

An embodiment of the present disclosure provides a computer-readable storage medium including at least one computer program for causing at least one processor to perform operations including receiving information about a downlink reference signal related to the uplink signal, determining a transmission beam and a sensing beam for the uplink signal based on the information, performing sensing on the sensing beam, and based on a channel, corresponding to the sensing beam, being idle, transmitting the uplink signal via the transmission beam According to [Proposed Method #1], [Proposed Method #2], [Proposed Method #9], and [Proposed Method #10] of the present disclosure, a user equipment (UE) may clearly recognize a sensing beam for sensing a scheduled transmission (Tx) beam by directly indicating information related to the sensing beam from a base station (BS) or indicating information about a reference signal (RS) related to the sensing beam.

According to [Proposed Method #3], [Proposed Method #4], [Proposed Method #5], and [Proposed Method #6] of the present disclosure, a UE or a BS may determine an appropriate listen before talk (LBT) type according to a transmission interval within a channel occupancy time (COT) obtained by the UE or the BS and whether the COT is shared and perform LBT or perform transmission without the LBT, and thus may perform effective transmission for minimizing an influence to another signal while satisfying regulations for each country/area within the COT.

According to [Proposed Method #7] and [Proposed Method #8] of the present disclosure, a measurement bandwidth may be determined in consideration of the characteristics of a band of 60 GHz and a subcarrier spacing (SCS) used in 60 GHz and measurement may be performed within the corresponding measurement bandwidth.

The effects obtainable in the present disclosure are not limited to the effects mentioned above, and other effects not mentioned are clearly understood by those skilled in the art from the description below.

DETAILED DESCRIPTION

Figure 1:
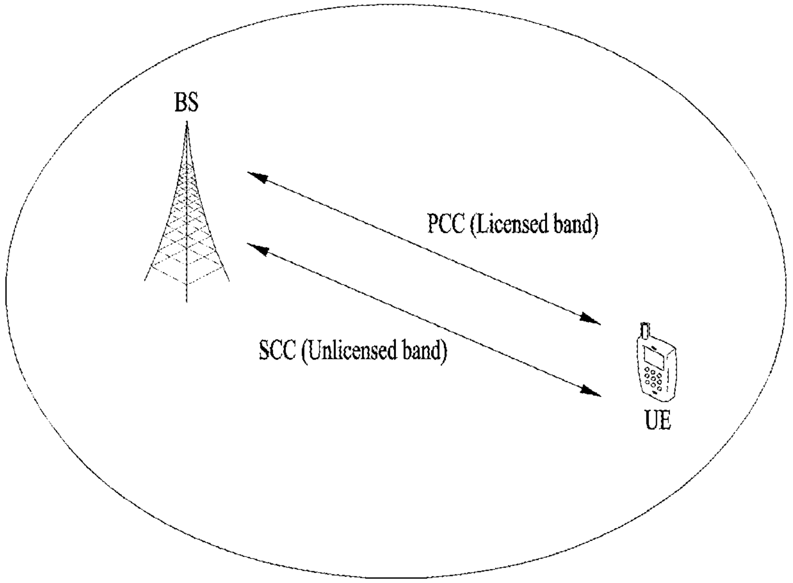
FIG. 1 illustrates an exemplary wireless communication system supporting an unlicensed band applicable to the present disclosure.
Figure 1:
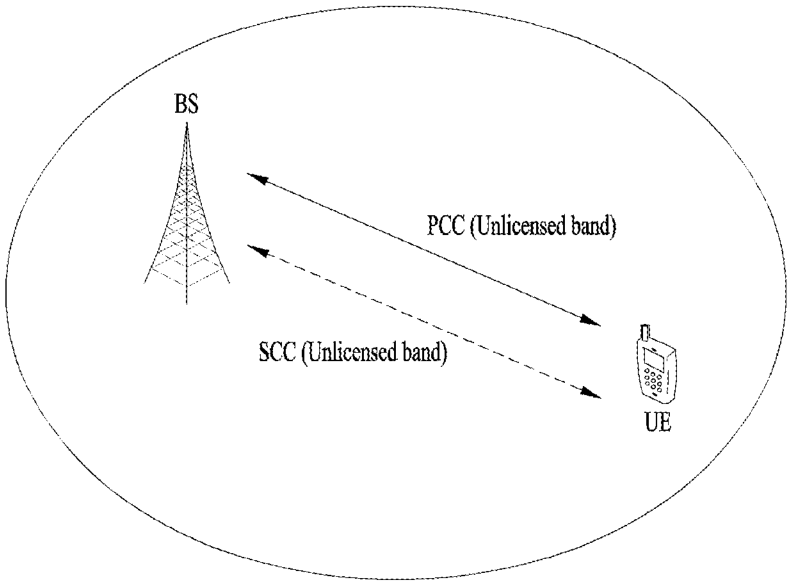

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11. (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

While the following description is given in the context of a 3GPP communication system (e.g., NR) for clarity, the technical spirit of the present disclosure is not limited to the 3GPP communication system. For the background art, terms, and abbreviations used in the present disclosure, refer to the technical specifications published before the present disclosure (e.g., 38.211, 38.212, 38.213, 38.214, 38.300, 38.331, and so on).

5G communication involving a new radio access technology (NR) system will be described below.

Three key requirement areas of 5G are (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is AR for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases in a 5G communication system including the NR system will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup may be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

Similarly to licensed-assisted access (LAA) in the legacy 3GPP LTE system, use of an unlicensed band for cellular communication is also under consideration in a 3GPP NR system. Unlike LAA, a stand-along (SA) operation is aimed in an NR cell of an unlicensed band (hereinafter, referred to as NR unlicensed cell (UCell)). For example, PUCCH, PUSCH, and PRACH transmissions may be supported in the NR UCell.

On LAA UL, with the introduction of an asynchronous HARQ procedure, there is no additional channel such as a physical HARQ indicator channel (PHICH) for indicating HARQ-ACK information for a PUSCH to the UE. Therefore, accurate HARQ-ACK information may not be used to adjust a contention window (CW) size in a UL LBT procedure. In the UL LBT procedure, when a UL grant is received in the n-th subframe, the first subframe of the most recent UL transmission burst prior to the (n−3)-th subframe has been configured as a reference subframe, and the CW size has been adjusted based on a new data indicator (NDI) for a HARQ process ID corresponding to the reference subframe. That is, when the BS toggles NDIs per one or more transport blocks (TBs) or instructs that one or more TBs be retransmitted, a method has been introduced of increasing the CW size to the next largest CW size of a currently applied CW size in a set for pre-agreed CW sizes under the assumption that transmission of a PUSCH has failed in the reference subframe due to collision with other signals or initializing the CW size to a minimum value (e.g., CWmin) under the assumption that the PUSCH in the reference subframe has been successfully transmitted without any collision with other signals.

In an NR system to which various Embodiments of the present disclosure are applicable, up to 400 MHz per component carrier (CC) may be allocated/supported. When a UE operating in such a wideband CC always operates with a radio frequency (RF) module turned on for the entire CC, battery consumption of the UE may increase.

Alternatively, considering various use cases (e.g., eMBB, URLLC, mMTC, and so on) operating within a single wideband CC, a different numerology (e.g., SCS) may be supported for each frequency band within the CC.

Alternatively, each UE may have a different maximum bandwidth capability.

In this regard, the BS may indicate to the UE to operate only in a partial bandwidth instead of the total bandwidth of the wideband CC. The partial bandwidth may be defined as a bandwidth part (BWP).

A BWP may be a subset of contiguous RBs on the frequency axis. One BWP may correspond to one numerology (e.g., SCS, CP length, slot/mini-slot duration, and so on).

FIG. 1 illustrates an exemplary wireless communication system supporting an unlicensed band applicable to the present disclosure.

In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When a BS and a UE transmit and receive signals on carrier-aggregated LCC and UCC as illustrated in FIG. 1(*a*), the LCC and the UCC may be configured as a primary CC (PCC) and a secondary CC (SCC), respectively. The BS and the UE may transmit and receive signals on one UCC or on a plurality of carrier-aggregated UCCs as illustrated in FIG. 1(*b*). In other words, the BS and UE may transmit and receive signals only on UCC(s) without using any LCC. For an SA operation, PRACH, PUCCH, PUSCH, and SRS transmissions may be supported on a UCell.

Signal transmission and reception operations in an unlicensed band as described in the present disclosure may be applied to the afore-mentioned deployment scenarios (unless specified otherwise).

Unless otherwise noted, the definitions below are applicable to the following terminologies used in the present disclosure.

- Channel: a carrier or a part of a carrier composed of a contiguous set of RBs in which a channel access procedure (CAP) is performed in a shared spectrum.
- Channel access procedure (CAP): a procedure of assessing channel availability based on sensing before signal transmission in order to determine whether other communication node(s) are using a channel. A basic sensing unit is a sensing slot with a duration of Tsl=9 us. The BS or the UE senses the slot during a sensing slot duration. When power detected for at least 4 us within the sensing slot duration is less than an energy detection threshold Xthresh, the sensing slot duration Tsl is be considered to be idle. Otherwise, the sensing slot duration Tsl is considered to be busy. CAP may also be called listen before talk (LBT).
- Channel occupancy: transmission(s) on channel(s) from the BS/UE after a CAP.
- Channel occupancy time (COT): a total time during which the BS/UE and any BS/UE(s) sharing channel occupancy performs transmission(s) on a channel after a CAP. Regarding COT determination, if a transmission gap is less than or equal to 25 us, the gap duration may be counted in a COT.

The COT may be shared for transmission between the BS and corresponding UE(s).

Specifically, sharing a UE-initiated COT with the BS may mean an operation in which the UE assigns a part of occupied channels through random backoff counter-based LBT (e.g., Category 3 (Cat-3) LBT or Category 4 (Cat-4) LBT) to the BS and the BS performs DL transmission using a remaining COT of the UE, when it is confirmed that a channel is idle by success of LBT after performing LBT without random backoff counter (e.g., Category 1 (Cat-1) LBT or Category 2 (Cat-2) LBT) using a timing gap occurring before DL transmission start from a UL transmission end timing of the UE.

Meanwhile, sharing a gNB-initiated COT with the UE may mean an operation in which the BS assigns a part of occupied channels through random backoff counter-based LBT (e.g., Cat-3 LBT or Cat-4 LBT) to the UE and the UE performs UL transmission using a remaining COT of the BS, when it is confirmed that a channel is idle by success of LBT after performing LBT without random backoff counter (e.g., Cat-1 LBT or Cat-2 LBT) using a timing gap occurring before UL transmission start from a DL transmission end timing of the BS.

- DL transmission burst: a set of transmissions without any gap greater than 16 us from the BS. Transmissions from the BS, which are separated by a gap exceeding 16 us are considered as separate DL transmission bursts. The BS may perform transmission(s) after a gap without sensing channel availability within a DL transmission burst.
- UL transmission burst: a set of transmissions without any gap greater than 16 us from the UE. Transmissions from the UE, which are separated by a gap exceeding 16 us are considered as separate UL transmission bursts. The UE may perform transmission(s) after a gap without sensing channel availability within a DL transmission burst.
- Discovery burst: a DL transmission burst including a set of signal(s) and/or channel(s) confined within a window and associated with a duty cycle. The discovery burst may include transmission(s) initiated by the BS, which includes a PSS, an SSS, and a cell-specific RS (CRS) and further includes a non-zero power CSI-RS. In the NR system, the discover burst includes may include transmission(s) initiated by the BS, which includes at least an SS/PBCH block and further includes a CORESET for a PDCCH scheduling a PDSCH carrying SIB1, the PDSCH carrying SIB1, and/or a non-zero power CSI-RS.

Figure 2:
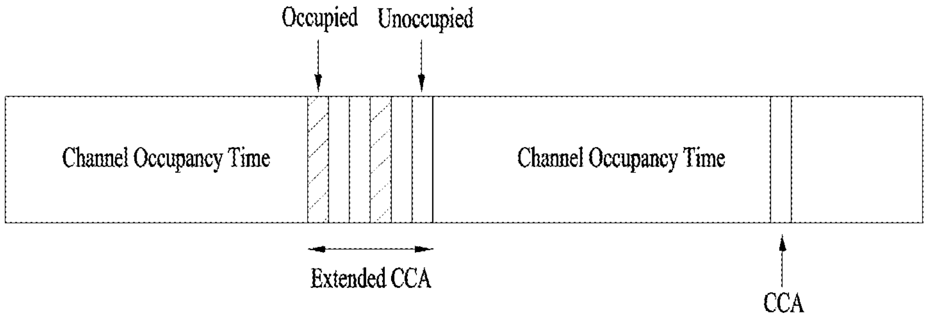
FIG. 2 illustrates an exemplary method of occupying resources in an unlicensed band.

FIG. 2 illustrates an exemplary method of occupying resources in an unlicensed band.

Referring to FIG. 2, a communication node (e.g., a BS or a UE) operating in an unlicensed band should determine whether other communication node(s) is using a channel, before signal transmission. For this purpose, the communication node may perform a CAP to access channel(s) on which transmission(s) is to be performed in the unlicensed band. The CAP may be performed based on sensing. For example, the communication node may determine whether other communication node(s) is transmitting a signal on the channel(s) by carrier sensing (CS) before signal transmission. Determining that other communication node(s) is not transmitting a signal is defined as confirmation of clear channel assessment (CCA). In the presence of a CCA threshold (e.g., Xthresh) which has been predefined or configured by higher-layer (e.g., RRC) signaling, the communication node may determine that the channel is busy, when detecting energy higher than the CCA threshold in the channel. Otherwise, the communication node may determine that the channel is idle. When determining that the channel is idle, the communication node may start to transmit a signal in the unlicensed band. CAP may be replaced with LBT.

Table 1 describes an exemplary CAP supported in NR-U.

TABLE 1

| | Type | Explanation |
|---|---|---|
| DL | Type 1 CAP | CAP with random backoff<br>time duration spanned by the sensing slots that are sensed to be idle before a downlink transmission(s) is random |
| | Type 2 CAP<br>Type 2A, 2B, 2C | CAP without random backoff<br>time duration spanned by sensing slots that are sensed to be idle before a downlink transmission(s) is deterministic |
| UL | Type 1 CAP | CAP with random backoff<br>time duration spanned by the sensing slots that are sensed to be idle before a downlink transmission(s) is random |
| | Type 2 CAP<br>Type 2A, 2B, 2C | CAP without random backoff<br>time duration spanned by sensing slots that are sensed to be idle before a downlink transmission(s) is deterministic |

In a wireless communication system supporting an unlicensed band, one cell (or carrier (e.g., CC)) or BWP configured for a UE may be a wideband having a larger bandwidth (BW) than in legacy LTE. However, a BW requiring CCA based on an independent LBT operation may be limited according to regulations. Let a subband (SB) in which LBT is individually performed be defined as an LBT-SB. Then, a plurality of LBT-SBs may be included in one wideband cell/BWP. A set of RBs included in an LBT-SB may be configured by higher-layer (e.g., RRC) signaling. Accordingly, one or more LBT-SBs may be included in one cell/BWP based on (i) the BW of the cell/BWP and (ii) RB set allocation information. A plurality of LBT-SBs may be included in the BWP of a cell (or carrier). An LBT-SB may be, for example, a 20-MHz band. The LBT-SB may include a plurality of contiguous (P)RBs in the frequency domain, and thus may be referred to as a (P)RB set.

A UE performs a Type 1 or Type 2 CAP for a UL signal transmission in an unlicensed band. In general, the UE may perform a CAP (e.g., Type 1 or Type 2) configured by a BS, for a UL signal transmission. For example, CAP type indication information may be included in a UL grant (e.g., DCI format 0_0 or DCI format 0_1) that schedules a PUSCH transmission.

In the Type 1 UL CAP, the length of a time period spanned by sensing slots sensed as idle before transmission(s) is random. The Type 1 UL CAP may be applied to the following transmissions.

- PUSCH/SRS transmission(s) scheduled and/or configured by BS
- PUCCH transmission(s) scheduled and/or configured by BS
- Transmission(s) related to random access procedure (RAP)

Figure 3:
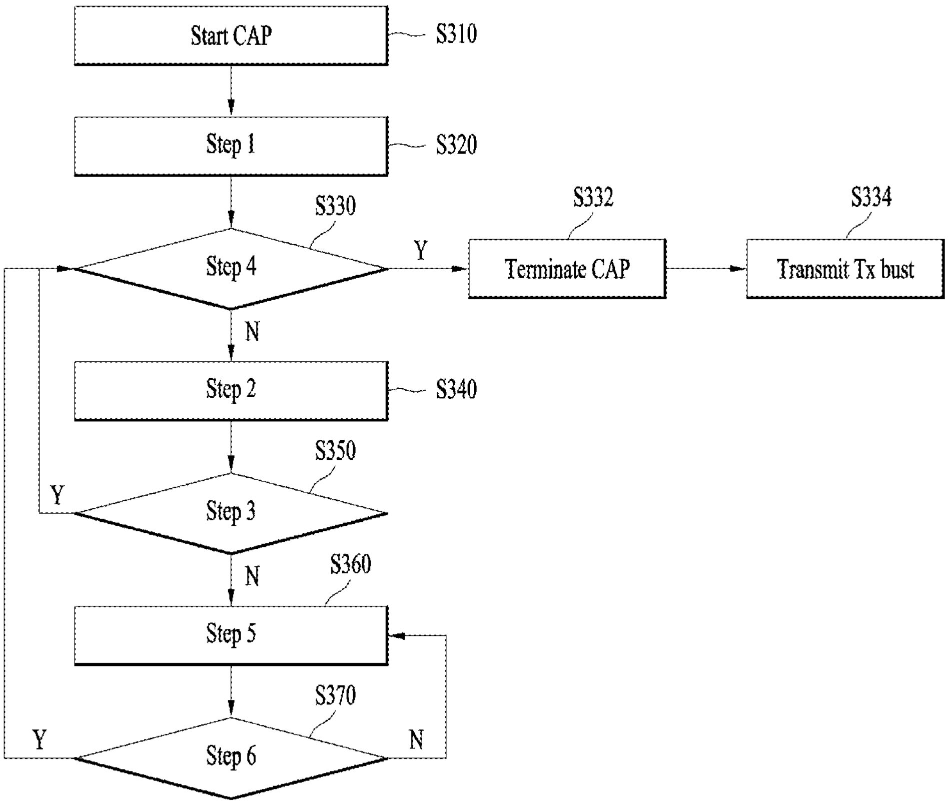
FIG. 3 illustrates a channel access procedure of a UE for UL/DL signal transmission in a U-band applicable to the present disclosure.

FIG. 3 illustrates Type 1 CAP among channel access procedures of a UE for UL/DL signal transmission in a U-band applicable to the present disclosure.

First, UL signal transmission in the U-band will be described with reference to FIG. 3.

The UE may sense whether a channel is idle for a sensing slot duration in a defer duration Td. After a counter N is decremented to 0, the UE may perform a transmission (S334). The counter N is adjusted by sensing the channel for additional slot duration(s) according to the following procedure.

Step 1) Set N=Ninit where Ninit is a random number uniformly distributed between 0 and CWp, and go to step 4 (S320).

Step 2) If N>0 and the UE chooses to decrement the counter, set N=N−1 (S340).

Step 3) Sense the channel for an additional slot duration, and if the additional slot duration is idle (Y), go to step 4. Else (N), go to step 5 (S350).

Step 4) If N=0 (Y) (S330), stop CAP (S332). Else (N), go to step 2.

Step 5) Sense the channel until a busy sensing slot is detected within the additional defer duration Td or all slots of the additional defer duration Td are sensed as idle (S360).

Step 6) If the channel is sensed as idle for all slot durations of the additional defer duration Td (Y), go to step 4. Else (N), go to step 5 (S370).

Table 2 illustrates that mp, a minimum CW, a maximum CW, a maximum channel occupancy time (MCOT), and an allowed CW size applied to a CAP vary according to channel access priority classes.

TABLE 2

| Channel Access Priority Class (p) | mp | CWmin, p | CWmax, p | Tulmcot, p | allowed CWp sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 or 10 ms | {15, 31, 63, 127, 255, 511, 1023} |
| 4 | 7 | 15 | 1023 | 6 or 10 ms | {15, 31, 63, 127, 255, 511, 1023} |

The defer duration Td includes a duration Tf (16 us) immediately followed by mp consecutive slot durations where each slot duration Tsl is 9 us, and Tf includes a sensing slot duration Tsl at the start of the 16-us duration. CWWmin,p<=CWp<=CWmax,p. CWp is set to CWmin,p, and may be updated before Step 1 based on an explicit/implicit reception response to a previous UL burst (e.g., PUSCH) (CW size update). For example, CWp may be initialized to CWmin,p based on an explicit/implicit reception response to the previous UL burst, may be increased to the next higher allowed value, or may be maintained to be an existing value.

In the Type 2 UL CAP, the length of a time period spanned by sensing slots sensed as idle before transmission(s) is deterministic. Type 2 UL CAPs are classified into Type 2A UL CAP, Type 2B UL CAP, and Type 2C UL CAP. In the Type 2A UL CAP, the UE may transmit a signal immediately after the channel is sensed as idle during at least a sensing duration Tshort_dl (=25 us). Tshort_dl includes a duration Tf (=16 us) and one immediately following sensing slot duration. In the Type 2A UL CAP, Tf includes a sensing slot at the start of the duration. In the Type 2B UL CAP, the UE may transmit a signal immediately after the channel is sensed as idle during a sensing slot duration Tf (=16 us). In the Type 2B UL CAP, Tf includes a sensing slot within the last 9 us of the duration. In the Type 2C UL CAP, the UE does not sense a channel before a transmission.

To allow the UE to transmit UL data in the unlicensed band, the BS should succeed in an LBT operation to transmit a UL grant in the unlicensed band, and the UE should also succeed in an LBT operation to transmit the UL data. That is, only when both of the BS and the UE succeed in their LBT operations, the UE may attempt the UL data transmission. Further, because a delay of at least 4 msec is involved between a UL grant and scheduled UL data in the LTE system, earlier access from another transmission node coexisting in the unlicensed band during the time period may defer the scheduled UL data transmission of the UE. In this context, a method of increasing the efficiency of UL data transmission in an unlicensed band is under discussion.

To support a UL transmission having a relatively high reliability and a relatively low time delay, NR also supports CG type 1 and CG type 2 in which the BS preconfigures time, frequency, and code resources for the UE by higher-layer signaling (e.g., RRC signaling) or both of higher-layer signaling and L1 signaling (e.g., DCI). Without receiving a UL grant from the BS, the UE may perform a UL transmission in resources configured with type 1 or type 2. In type 1, the periodicity of a CG, an offset from SFN=0, time/frequency resource allocation, a repetition number, a DMRS parameter, an MCS/TB size (TBS), a power control parameter, and so on are all configured only by higher-layer signaling such as RRC signaling, without L1 signaling. Type 2 is a scheme of configuring the periodicity of a CG and a power control parameter by higher-layer signaling such as RRC signaling and indicating information about the remaining resources (e.g., the offset of an initial transmission timing, time/frequency resource allocation, a DMRS parameter, and an MCS/TBS) by activation DCI as L1 signaling.

The biggest difference between autonomous uplink (AUL) of LTE LAA and a CG of NR is a HARQ-ACK feedback transmission method for a PUSCH that the UE has transmitted without receiving a UL grant and the presence or absence of UCI transmitted along with the PUSCH. While a HARQ process is determined by an equation of a symbol index, a symbol periodicity, and the number of HARQ processes in the CG of NR, explicit HARQ-ACK feedback information is transmitted in AUL downlink feedback information (AUL-DFI) in LTE LAA. Further, in LTE LAA, UCI including information such as a HARQ ID, an NDI, and an RV is also transmitted in AUL UCI whenever AUL PUSCH transmission is performed. In the case of the CG of NR, the BS identifies the UE by time/frequency resources and DMRS resources used for PUSCH transmission, whereas in the case of LTE LAA, the BS identifies the UE by a UE ID explicitly included in the AUL UCI transmitted together with the PUSCH as well as the DMRS resources.

Now, DL signal transmission in the U-band will be described with reference to FIG. 3.

The BS may perform one of the following U-band access procedures (e.g., channel access procedures (CAPs)) to transmit a DL signal in the U-band.

(1) Type 1 DL CAP Method

In a Type 1 DL CAP, the length of a time duration spanned by sensing slots that are sensed to be idle before transmission(s) is random. The Type 1 DL CAP may be applied to the following transmissions:

(i) transmission(s) initiated by the BS, including (i) a unicast PDSCH with user plane data, or (ii) a unicast PDSCH with user plane data and a unicast PDCCH scheduling the user plane data; or transmission(s) initiated by the BS, including (i) only a discovery burst, or (ii) a discovery burst multiplexed with non-unicast information.

Figure 4:
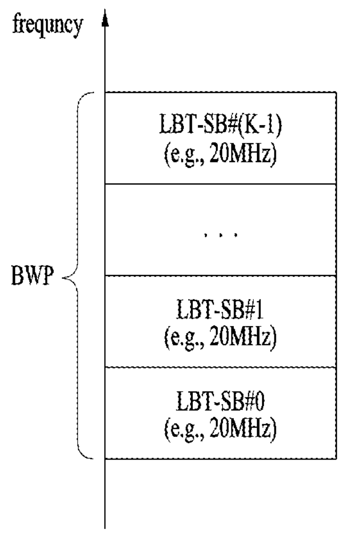
FIG. 4 is a diagram for explaining a plurality of listen before talk-subbands (LBT-SBs) applicable to the present disclosure.

Referring to FIG. 4, the BS may first sense whether a channel is idle for a sensing slot duration of a defer duration Td. Next, if a counter N is decremented to 0, transmission may be performed (S334). The counter N is adjusted by sensing the channel for additional slot duration(s) according to the following procedures.

Step 1) Set N=Ninit where Ninit is a random number uniformly distributed between 0 and CWp, and go to step 4 (S320).

Step 2) If N>0 and the BS chooses to decrement the counter, set N=N−1 (S340).

Step 3) Sense the channel for an additional slot duration, and if the additional slot duration is idle (Y), go to step 4. Else (N), go to step 5 (S350).

Step 4) If N=0 (Y), stop a CAP (S332)). Else (N), go to step 2 (S330).

Step 5) Sense the channel until a busy sensing slot is detected within the additional defer duration Td or all slots of the additional defer duration Td are sensed to be idle (S360).

Step 6) If the channel is sensed to be idle for all slot durations of the additional defer duration Td (Y), go to step 4. Else (N), go to step 5 (S370).

Table 3 illustrates that mp, a minimum CW, a maximum CW, an MCOT, and an allowed CW size, which are applied to a CAP, vary according to channel access priority classes.

TABLE 3

| Channel Access Priority Class (p) | mp | CWmin, p | CWmax, p | Tmcot, p | allowed CWp sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

The defer duration Td includes a duration Tf (16 μs) immediately followed by mp consecutive sensing slot durations where each sensing slot duration Tsl is 9 μs, and Tf includes the sensing slot duration Tsl at the start of the 16-μs duration.

CWmin,p⇐CWp⇐CWmax,p. CWp is set to CWmin,p, and may be updated (CW size update) before Step 1 based on HARQ-ACK feedback (e.g., ratio of ACK signals or NACK signals) for a previous DL burst (e.g., PDSCH). For example, CWp may be initialized to CWmin,p based on HARQ-ACK feedback for the previous DL burst, may be increased to the next highest allowed value, or may be maintained at an existing value.

(2) Type 2 DL CAP Method

In a Type 2 DL CAP, the length of a time duration spanned by sensing slots sensed to be idle before transmission(s) is deterministic. Type 2 DL CAPs are classified into Type 2A DL CAP, Type 2B DL CAP, and Type 2C DL CAP.

The Type 2A DL CAP may be applied to the following transmissions. In the Type 2A DL CAP, the BS may transmit a signal immediately after a channel is sensed to be idle during at least a sensing duration Tshort_dl=25 μs. Tshort_dl includes a duration Tf (=16 μs) and one immediately following sensing slot duration. Tf includes the sensing slot at the start of the duration.

Transmission(s) initiated by the BS, including (i) only a discovery burst, or (ii) a discovery burst multiplexed with non-unicast information, or Transmission(s) of the BS after a gap of 25 μs from transmission(s) by the UE within shared channel occupancy.

The Type 2B DL CAP is applicable to transmission(s) performed by the BS after a gap of 16 μs from transmission(s) by the UE within shared channel occupancy. In the Type 2B DL CAP, the BS may transmit a signal immediately after a channel is sensed to be idle during Tf=16 μs. Tf includes a sensing slot within the last 9 μs of the duration. The Type 2C DL CAP is applicable to transmission(s) performed by the BS after a maximum of a gap of 16 μs from transmission(s) by the UE within shared channel occupancy. In the Type 2C DL CAP, the BS does not sense a channel before performing transmission.

In a wireless communication system supporting a U-band, one cell (or carrier (e.g., CC)) or BWP configured for the UE may consist of a wideband having a larger BW than in legacy LTE. However, a BW requiring CCA based on an independent LBT operation may be limited according to regulations. If a subband (SB) in which LBT is individually performed is defined as an LBT-SB, a plurality of LBT-SBs may be included in one wideband cell/BWP. A set of RBs constituting an LBT-SB may be configured by higher-layer (e.g., RRC) signaling. Accordingly, one or more LBT-SBs may be included in one cell/BWP based on (i) the BW of the cell/BWP and (ii) RB set allocation information.

FIG. 4 illustrates that a plurality of LBT-SBs is included in a U-band.

Referring to FIG. 4, a plurality of LBT-SBs may be included in the BWP of a cell (or carrier). An LBT-SB may be, for example, a 20-MHz band. The LBT-SB may include a plurality of contiguous (P)RBs in the frequency domain and thus may be referred to as a (P)RB set. Although not illustrated, a guard band (GB) may be included between the LBT-SBs. Therefore, the BWP may be configured in the form of {LBT-SB #0 (RB set #0)+GB #0+LBT-SB #1 (RB set #1+GB #1)+ . . . +LBT-SB #(K−1) (RB set (#K−1))}. For convenience, LBT-SB/RB indexes may be configured/defined to be increased as a frequency band becomes higher starting from a low frequency band.

In UL, a BS may dynamically allocate resources for uplink transmission to a UE through PDCCH(s) (including DCI format 0_0 or DCI format 0_1). The BS may allocate uplink resources for initial HARQ transmission to the UE based on a configured grant method (similar to SPS). In dynamic scheduling, PUSCH transmission is accompanied by a PDCCH, but in configured grant, PUSCH transmission is not accompanied by the PDCCH. However, UL resources for retransmission are explicitly allocated through PDCCH(s). As such, an operation in which UL resources are preset by the BS without a dynamic grant (e.g., UL grant through scheduling DCI) is referred to as "configured grant". The configured grant is defined in the following two types.

Type 1: The UL grant of a certain period is provided by higher layer signaling (configured without separate first layer signaling)

Type 2: A period of the UL grant is configured by higher layer signaling, and the UL grant is provided by signaling activation/deactivation of the grant configured through the PDCCH.

Figure 5:
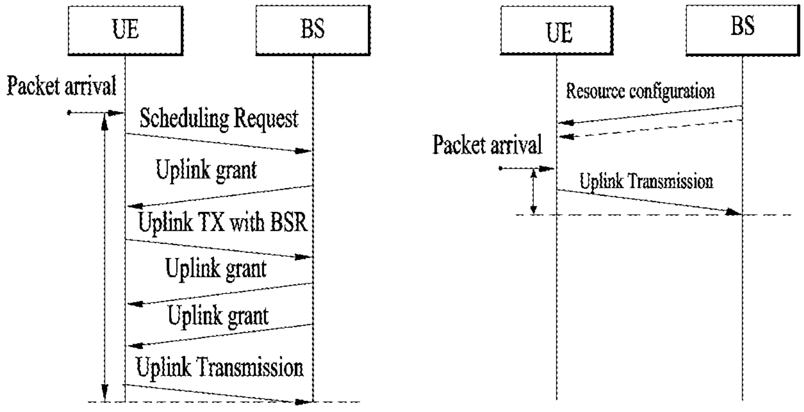
FIG. 5 illustrates an example of a UL transmission operation of a UE.

FIG. 5 illustrates an example of a UL transmission operation of a UE. The UE may transmit a packet to be transmitted based on a dynamic grant ((a) of FIG. 5) or transmit the packet based on a preset grant ((b) of FIG. 5).

Resources for grants configured for a plurality of UEs may be shared. Uplink signal transmission based on respective configured grants of the UEs may be identified based on time/frequency resources and reference signal parameters (e.g., different cyclic shifts). Accordingly, when uplink transmission fails due to signal collision or the like, the BS may identify the corresponding UE and explicitly transmit a retransmission grant for the corresponding transport block to the corresponding UE.

By the configured grant, repeated transmission K times including initial transmission is supported for the same transport block. A HARQ process ID for the UL signal repeatedly transmitted K times is determined equally based on resources for initial transmission. A redundancy version for the corresponding transport block, which is repeatedly transmitted K times, is one pattern of {0, 2, 3, 1}, {0, 3, 0, 3}, or {0, 0, 0, 0}.

In the NR system, a massive multiple input multiple output (MIMO) environment in which the number of transmission/reception (Tx/Rx) antennas is significantly increased may be under consideration. That is, as the massive MIMO environment is considered, the number of Tx/Rx antennas may be increased to a few tens or hundreds. The NR system supports communication in an above 6 GHz band, that is, a millimeter frequency band. However, the millimeter frequency band is characterized by the frequency property that a signal is very rapidly attenuated according to a distance due to the use of too high a frequency band. Therefore, in an NR system operating at or above 6 GHz, beamforming (BF) is considered, in which a signal is transmitted with concentrated energy in a specific direction, not omnidirectionally, to compensate for rapid propagation attenuation. Accordingly, there is a need for hybrid BF with analog BF and digital BF in combination according to a position to which a BF weight vector/precoding vector is applied, for the purpose of increased performance, flexible resource allocation, and easiness of frequency-wise beam control in the massive MIMO environment.

Figure 6:
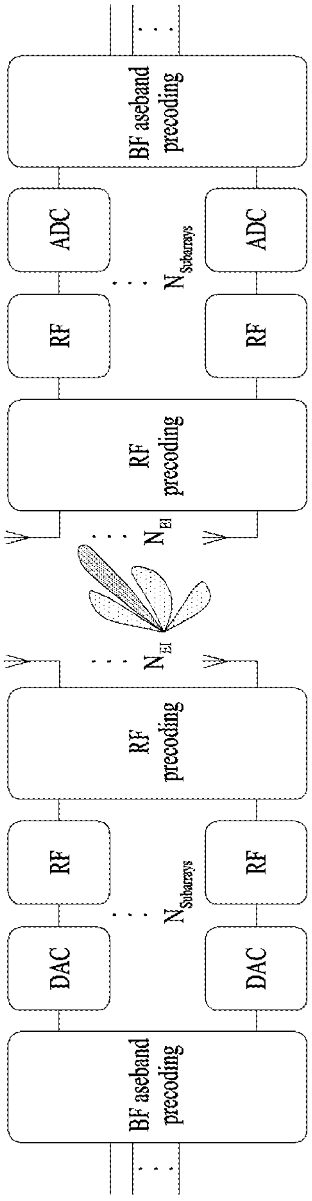
FIG. 6 is a diagram for explaining analog beamforming in an NR system.

FIG. 6 is a block diagram illustrating an exemplary transmitter and receiver for hybrid BF.

To form a narrow beam in the millimeter frequency band, a BF method is mainly considered, in which a BS or a UE transmits the same signal through multiple antennas by applying appropriate phase differences to the antennas and thus increasing energy only in a specific direction. Such BF methods include digital BF for generating a phase difference for digital baseband signals, analog BF for generating phase differences by using time delays (i.e., cyclic shifts) for modulated analog signals, and hybrid BF with digital BF and analog beamforming in combination. Use of a radio frequency (RF) unit (or transceiver unit (TXRU)) for antenna element to control transmission power and phase control on antenna element basis enables independent BF for each frequency resource. However, installing TXRUs in all of about 100 antenna elements is less feasible in terms of cost. That is, a large number of antennas are required to compensate for rapid propagation attenuation in the millimeter frequency, and digital BF needs as many RF components (e.g., digital-to-analog converters (DACs), mixers, power amplifiers, and linear amplifiers) as the number of antennas. As a consequence, implementation of digital BF in the millimeter frequency band increases the prices of communication devices. Therefore, analog BF or hybrid BF is considered, when a large number of antennas are needed as is the case with the millimeter frequency band. In analog BF, a plurality of antenna elements are mapped to a single TXRU and a beam direction is controlled by an analog phase shifter. Because only one beam direction is generated across a total band in analog BF, frequency-selective BF may not be achieved with analog BF. Hybrid BF is an intermediate form of digital BF and analog BF, using B RF units fewer than Q antenna elements. In hybrid BF, the number of beam directions available for simultaneous transmission is limited to B or less, which depends on how B RF units and Q antenna elements are connected.

Beam Management (BM)

The BM refers to a series of processes for acquiring and maintaining a set of BS beams (transmission and reception point (TRP) beams) and/or a set of UE beams available for DL and UL transmission/reception. The BM may include the following processes and terminology.

- Beam measurement: an operation by which the BS or UE measures the characteristics of a received beamformed signal
- Beam determination: an operation by which the BS or UE selects its Tx/Rx beams
- Beam sweeping: an operation of covering a spatial domain by using Tx and/or Rx beams for a prescribed time interval according to a predetermined method
- Beam report: an operation by which the UE reports information about a signal beamformed based on the beam measurement.

The BM procedure may be divided into (1) a DL BM procedure using an SSB or CSI-RS and (2) a UL BM procedure using an SRS. Further, each BM procedure may include Tx beam sweeping for determining a Tx beam, and Rx beam sweeping for determining an Rx beam.

The DL BM procedure may include (1) transmission of beamformed DL RSs (e.g., CSI-RS or SSB) from the BS and (2) beam reporting from the UE.

A beam report may include preferred DL RS ID(s) and reference signal received power(s) (RSRP(s)) corresponding to the preferred DL RS ID(s). A DL RS ID may be an SSB resource indicator (SSBRI) or a CSI-RS resource indicator (CRI).

Figure 7:
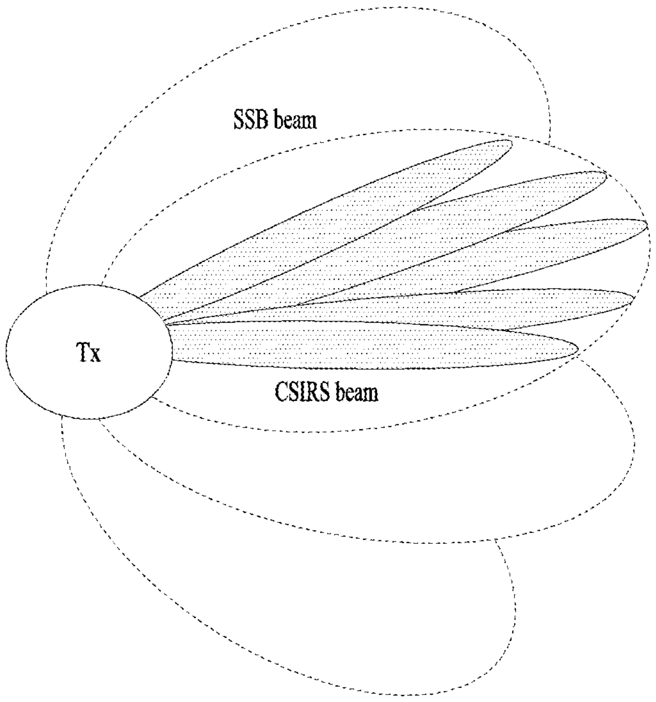
FIGS. 7 to 11 are diagrams for explaining beam measurement in an NR system.

FIG. 7 illustrates an example of beamforming using an SSB and a CSI-RS.

As shown in FIG. 7, an SSB beam and a CSI-RS beam may be used for beam measurement. A measurement metric is an RSRP for each resource/block. The SSB may be used for coarse beam measurement, and the CSI-RS may be used for fine beam measurement. The SSB may be used for both Tx beam sweeping and Rx beam sweeping. The Rx beam sweeping using the SSB may be be performed by the UE attempting to receive the SSB while changing an Rx beam for the same SSBRI across multiple SSB bursts. Here, one SS burst includes one or more SSBs, and one SS burst set includes one or more SSB bursts.

1. DL BM Using SSB

Figure 8:
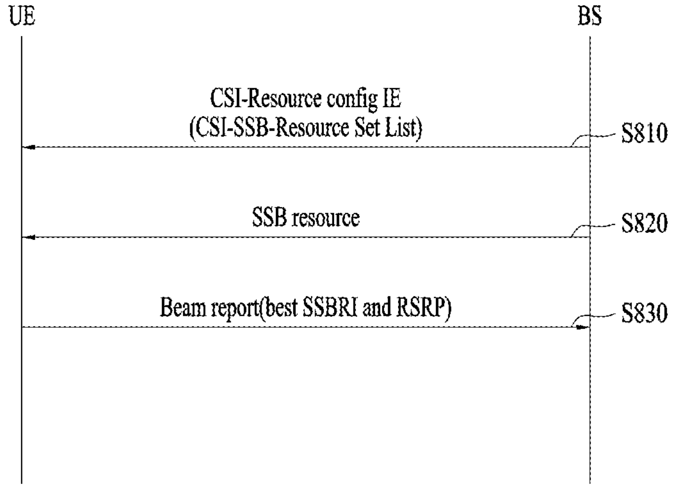

FIG. 8 is a flowchart showing an example of a DL BM process using an SSB.

Configuration for beam report using the SSB is performed when configuring channel state information (CSI)/beam in RRC_CONNECTED.

- A UE receives CSI-ResourceConfig IE including CSI-SSB-ResourceSetList for SSB resources used for a BM from a BS (S810). An RRC parameter csi-SSB-ResourceSetList represents a list of SSB resources used for beam management and beam report in one resource set. Here, the SSB resource set may be configured to {SSBx1, SSBx2, SSBx3, SSBx4, x}. An SSB index may be defined from 0 to 63.
- The UE receives signals on SSB resources from the BS based on the CSI-SSB-ResourceSetList (S820).
- When CSI-RS reportConfig related to reporting on the SSBRI and reference signal received power (RSRP) is configured, the UE reports the best SSBRI and the corresponding RSRP to the BS (S830). For example, when the reportQuantity of the CSI-RS reportConfig IE is configured to "ssb-Index-RSRP", the UE reports the best SSBRI and the corresponding RSRP to the BS.

When CSI-RS resources configured in the same OFDM symbol(s) as the SSB, and "QCL-TypeD" is applicable, the UE may assume the CSI-RS and the SSB to be quasi co-located (QCL) in terms of the "QCL-TypeD". Here, the QCL-TypeD may mean that antenna ports are QCL in terms of a spatial Rx parameter. When the UE receives signals from a plurality of DL antenna ports in a QCL-TypeD relationship, the same reception beam may be applied.

2. DL BM Using CSI-RS

With regard to the use of CSI-RS, i) when a repetition parameter is configured for a specific CSI-RS resource set and TRS_info is not configured, a CSI-RS is used for beam management. ii) When the repetition parameter is not configured and TRS_info is configured, the CSI-RS is used for a tracking reference signal (TRS). iii) When the repetition parameter is not configured and the TRS_info is not configured, the CSI-RS is used for CSI acquisition.

When (RRC parameter) repetition is configured to "ON", this is related to an Rx beam sweeping process of the UE. When repetition is configured to "ON", if the UE is configured with the NZP-CSI-RS-ResourceSet, the UE may assume that signals of at least one CSI-RS resource in the NZP-CSI-RS-ResourceSet is to be transmitted to the same DL spatial domain filter. That is, at least one CSI-RS resource in the NZP-CSI-RS-ResourceSet is transmitted through the same Tx beam. Here, signals of at least one CSI-RS resource in the NZP-CSI-RS-ResourceSet may be transmitted in different OFDM symbols.

Figure 12:
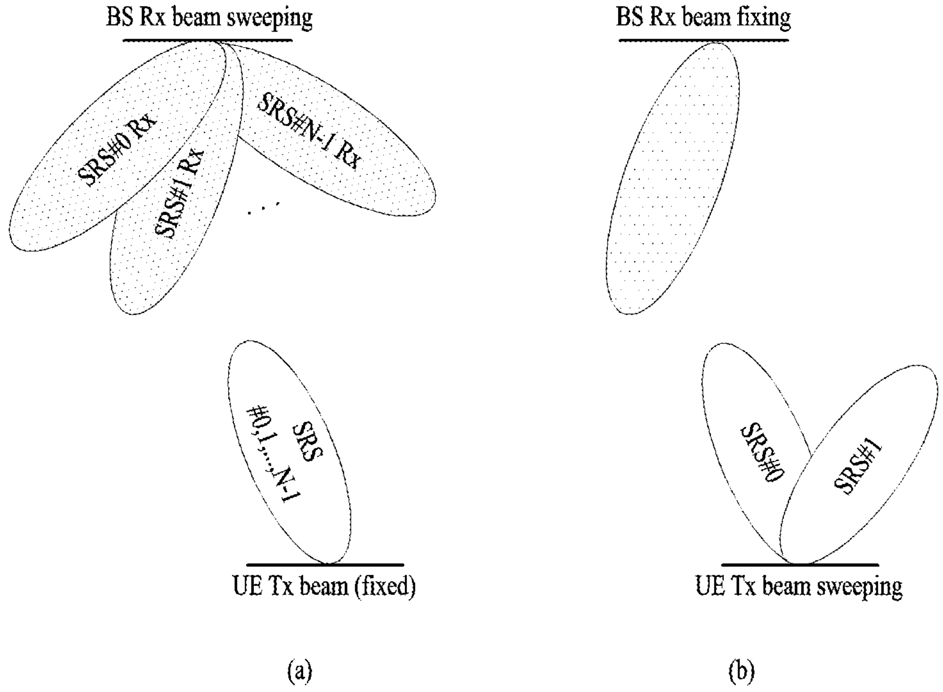
FIGS. 12 and 13 are diagrams for explaining a sounding reference signal (SRS) applicable to the present disclosure.

In contrast, when repetition is configured to "OFF", this is related to a Tx beam sweeping process of the BS. When repetition is configured to "OFF", the UE may not assume that signals of at least one CSI-RS resource in the NZP-CSI-RS-ResourceSet are transmitted with the same DL spatial domain transmission filter. That is, signals of at least one CSI-RS resource in the NZP-CSI-RS-ResourceSet are transmitted through different Tx beams. FIG. 12 shows another example of a DL BM process using a CSI-RS.

Figure 9:
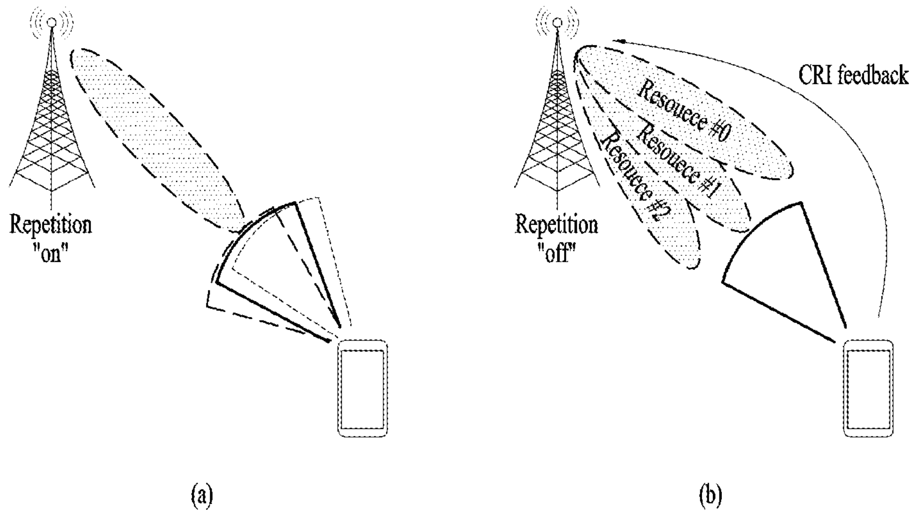
Figure 18:
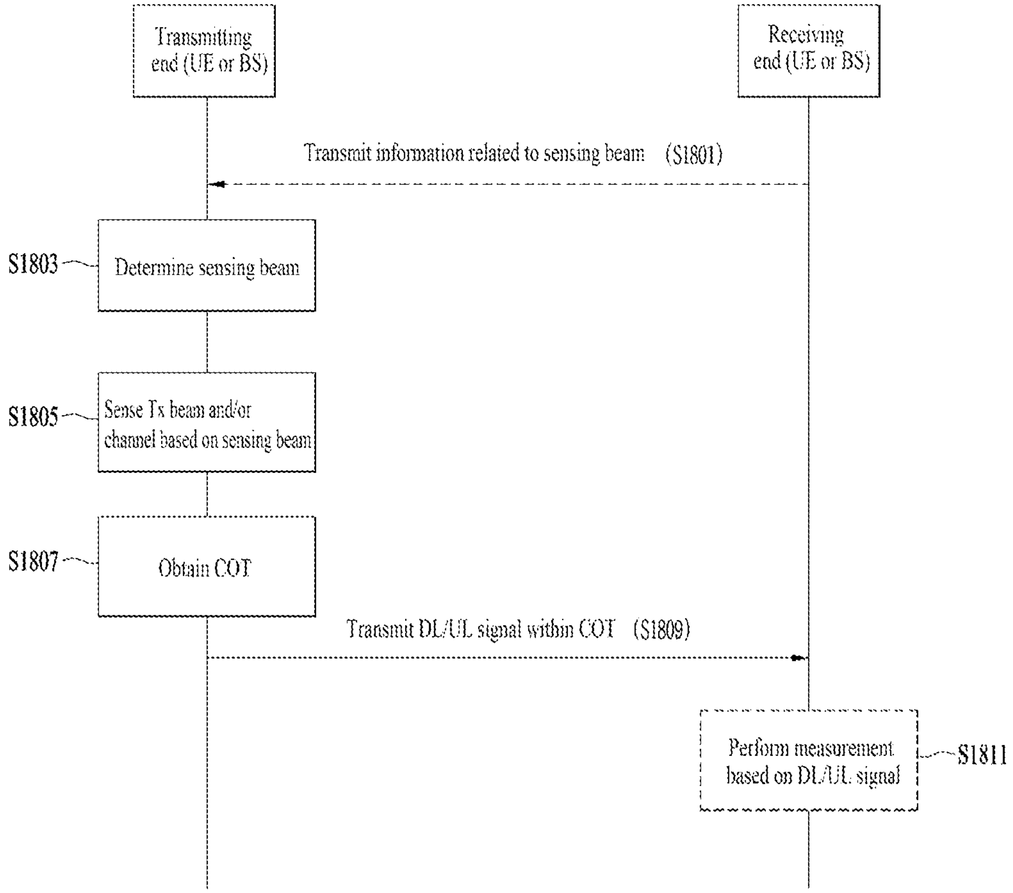

(a) of FIG. 9 shows an Rx beam determination (or refinement) process of a UE, and (b) of FIG. 9 shows a Tx beam sweeping process of a BS. (a) of FIG. 9 shows a case in which a repetition parameter is configured to "ON", and (b) of FIG. 18 shows a case in which the repetition parameter is configured to "OFF".

With reference to (a) of FIG. 9 and (a) of FIG. 10, an Rx beam determination process of a UE will be described.

Figure 10:
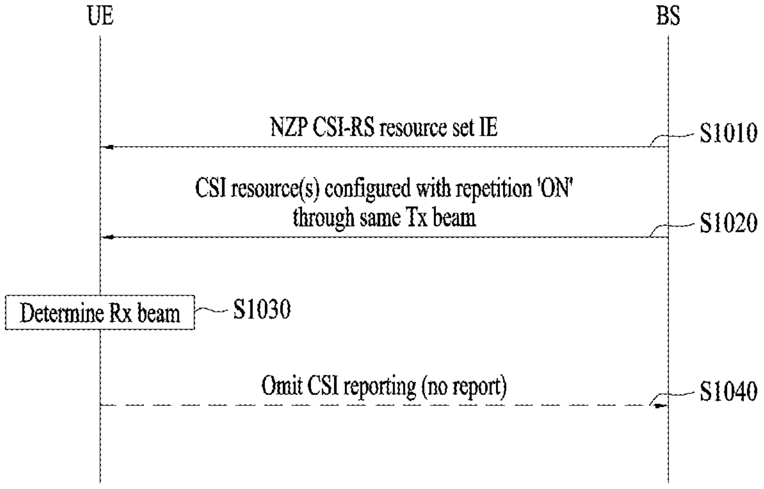
Figure 10:
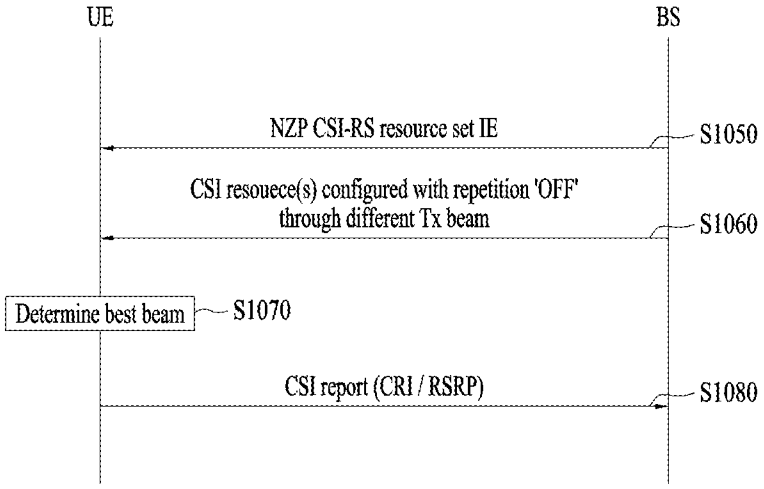

(a) of FIG. 10 is a flowchart showing an example of a reception beam determination process of the UE.

- The UE receives the NZP CSI-RS resource set IE including an RRC parameter about "repetition" from the BS through RRC signaling (S1010). Here, the RRC parameter 'repetition' is configured to "ON".

The UE repeatedly receives signals on the resource(s) in the CSI-RS resource in which the RRC parameter "repetition" is configured to "ON" in different OFDM symbols through the same Tx beam (or DL spatial domain transmission filter) of the BS (S1020).

The UE determines an Rx beam thereof (S1030).

The UE omits the CSI report (S1040). That is, the UE may omit the CSI report when the RRC parameter "repetition" is configured to "ON".

With reference to (b) of FIG. 9 and (b) of FIG. 10, an Tx beam determination process of a BS will be described.

(b) of FIG. 10 is a flowchart showing an example of a transmission beam determination process of the BS.

The UE receives the NZP CSI-RS resource set IE including an RRC parameter about "repetition" from the BS through RRC signaling (S1050). Here, the RRC parameter "repetition" is configured to "OFF" and is related to the Tx beam sweeping process of the BS.

The UE receives signals on the resources in the CSI-RS resource in which the RRC parameter "repetition" is configured to "OFF" through different Tx beams (or DL spatial domain transmission filter) of the BS (S1060).

The UE selects (or determines) the best beam (S1070).

The UE reports an ID (e.g., CRI) and related quality information (e.g., RSRP) for the selected beam to the BS (S1080). That is, when the CSI-RS is transmitted for the BM, the UE reports the CRI and an RSRP thereof to the BS.

Figure 11:
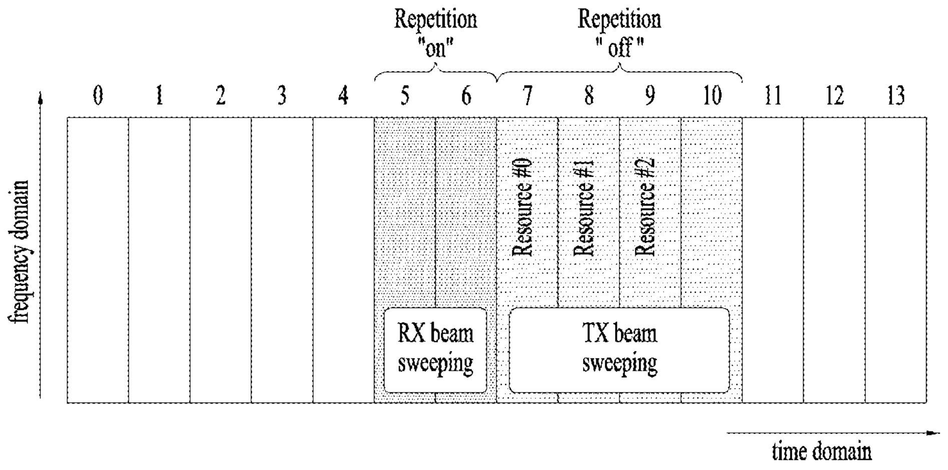

FIG. 11 shows an example of resource allocation in the time domain and frequency domain related to the operation of FIG. 9.

When repetition "ON" is configured in a CSI-RS resource set, multiple CSI-RS resources may be used repeatedly by applying the same transmission beam, and when repetition "OFF" is configured in the CSI-RS resource set, different CSI-RS resources may be transmitted through different transmission beams.

3. DL BM-Related Beam Indication

The UE may receive at least a list of up to M candidate transmission configuration indication (TCI) states for QCL indication by RRC signaling. M depends on a UE capability and may be 64.

Each TCI state may be configured with one RS set. Table 4 describes an example of a TCI-State IE. The TC-State IE is related to a QCL type corresponding to one or two DL RSs.

TABLE 4

```
--ASN1START
--TAG-TCI-STATE-START
TCI-State ::= SEQUENCE {
tci-StateId,
qcl-Type1 QCL-Info,
qcl-Type2 QCL-Info OPTIONAL,   -- Need R
...
}
QCL-Info ::= SEQUENCE {
cell ServCellIndex OPTIONAL, -- Need R
bwp-Id BWP-Id OPTIONAL, -- Cond CSI-RS-Indicated
referenceSignal CHOICE {
```

TABLE 4-continued

```
csi-rs NZP-CSI-RS-ResourceId,
ssb SSB-Index
},
qcl-Type ENUMERATED {typeA, typeB, typeC, typeD},
...
}
--TAG-TCI-STATE-STOP
-- ASN1STOP
```

In Table 4, 'bwp-Id' identifies a DL BWP in which an RS is located, 'cell' indicates a carrier in which the RS is located, and 'referencesignal' indicates reference antenna port(s) serving as a QCL source for target antenna port(s) or an RS including the reference antenna port(s). The target antenna port(s) may be for a CSI-RS, PDCCH DMRS, or PDSCH DMRS.

4. Quasi-Co Location (QCL)

The UE may receive a list of up to M TCI-State configurations to decode a PDSCH according to a detected PDCCH carrying DCI intended for a given cell. M depends on a UE capability.

As described in Table 4, each TCI-State includes a parameter for establishing the QCL relationship between one or more DL RSs and a PDSCH DM-RS port. The QCL relationship is established with an RRC parameter qcl-Type1 for a first DL RS and an RRC parameter qcl-Type2 for a second DL RS (if configured).

The QCL type of each DL RS is given by a parameter 'qcl-Type' included in QCL-Info and may have one of the following values.

'QCL-TypeA': {Doppler shift, Doppler spread, average delay, delay spread}

'QCL-TypeB': {Doppler shift, Doppler spread}

'QCL-TypeC': {Doppler shift, average delay}

'QCL-TypeD': {Spatial Rx parameter}

For example, if a target antenna port is for a specific NZP CSI-RS, the NZP CSI-RS antenna port may be indicated/configured as QCLed with a specific TRS from the perspective of QCL-Type A and with a specific SSB from the perspective of QCL-Type D. Upon receipt of this indication/configuration, the UE may receive the NZP CSI-RS using a Doppler value and a delay value which are measured in a QCL-TypeA TRS, and apply an Rx beam used to receive a QCL-Type D SSB for reception of the NZP CSI-RS UL BM Procedure In UL BM, beam reciprocity (or beam correspondence) between Tx and Rx beams may or may not be established according to the implementation of the UE. If the Tx-Rx beam reciprocity is established at both the BS and UE, a UL beam pair may be obtained from a DL beam pair. However, if the Tx-Rx beam reciprocity is established at neither the BS nor UE, a process for determining a UL beam may be required separately from determination of a DL beam pair.

In addition, even when both the BS and UE maintain the beam correspondence, the BS may apply the UL BM procedure to determine a DL Tx beam without requesting the UE to report its preferred beam.

The UL BM may be performed based on beamformed UL SRS transmission. Whether the UL BM is performed on a set of SRS resources may be determined by a usage parameter (RRC parameter). If the usage is determined as BM, only one SRS resource may be transmitted for each of a plurality of SRS resource sets at a given time instant.

The UE may be configured with one or more SRS resource sets (through RRC signaling), where the one or more SRS resource sets are configured by SRS-ResourceSet (RRC parameter). For each SRS resource set, the UE may be configured with K≥1 SRS resources, where K is a natural number, and the maximum value of K is indicated by SRS_capability.

The UL BM procedure may also be divided into Tx beam sweeping at the UE and Rx beam sweeping at the BS similarly to DL BM.

FIG. 12 shows an example of a DL BM process using an SRS.

(a) of FIG. 12 illustrates an Rx beamforming determination process of a BS, and (b) of FIG. 12 illustrates a Tx beam sweeping process of a UE.

Figure 13:
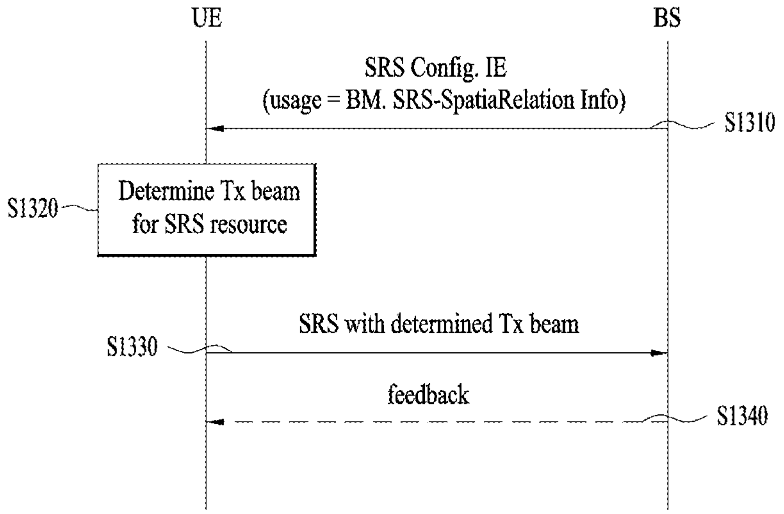

FIG. 13 is a flowchart showing an example of a UL BM process using an SRS.

The UE receives RRC signaling (e.g., SRS-Config IE) including a use parameter (RRC parameter) configured to "beam management" from the BS (S1310). SRS-Config IE is used for SRS transmission configuration. SRS-Config IE includes a list of SRS-Resources and a list of SRS-ResourceSets. Each SRS resource set refers to a set of SRS-resources.

The UE determines Tx beamforming for an SRS resource to be transmitted based on SRS-SpatialRelation Info included in the SRS-Config IE (S1320). Here, SRS-SpatialRelation Info is configured for each SRS resource and indicates whether to apply the same beamforming as beamforming used in the SSB, the CSI-RS, or the SRS for each SRS resource.

When SRS-SpatialRelationInfo is configured in the SRS resource, the same beamforming as beamforming used in the SSB, the CSI-RS or the SRS is applied and transmitted. However, when SRS-SpatialRelationInfo is not configured in the SRS resource, the UE randomly determines Tx beamforming and transmits the SRS through the determined Tx beamforming (S1330).

In more detail, for a P-SRS with "SRS-ResourceConfigType" configured to be "periodic":

i) When SRS-SpatialRelationInfo is configured to "SSB/PBCH", the UE applies a spatial domain transmission filter identical to (or generated from) the spatial domain Rx filter used for reception of SSB/PBCH and transmits the corresponding SRS; or ii) When the SRS-SpatialRelationInfo is configured to "CSI-RS", the UE applies the same spatial domain transmission filter as a filter used for reception of the CSI-RS and transmits the SRS; or ii) When the SRS-SpatialRelationInfo is configured to "SRS", the UE applies the same spatial domain transmission filter as a filter used for transmission of the SRS and transmits the corresponding SRS.

The UE may or may not receive feedback about the SRS from the BS in the following three cases (S1340).

i) When the Spatial_Relation_Info is configured for all SRS resources in the SRS resource set, the UE transmits the SRS through a beam indicated by the BS. For example, when all of the Spatial_Relation_Info indicate the same SSB, CRI, or SRI, the UE repeatedly transmits the SRS through the same beam.

ii) The Spatial_Relation_Info may not be configured for all SRS resources in the SRS resource set. In this case, the UE may freely transmit the resources while changing SRS beamforming.

ii) The Spatial_Relation_Info may be configured for only some SRS resources in the SRS resource set. In this case, for the configured SRS resources, the SRS may be transmitted using an indicated beam, and for the SRS resources for which Spatial_Relation_Info is not configured, the UE may arbitrarily apply Tx beamforming and transmit the resources.

In the proposed methods described below, a beam may refer to an area for performing a specific operation (e.g., LBT or transmission) by concentrating power in a specific direction and/or a specific space. In other words, the UE or the BS may perform operations such as LBT or transmission targeting a specific area (i.e., beam) corresponding to a specific space and/or a specific direction. Accordingly, each beam may correspond to each space and/or each direction. The UE or the BS may use a spatial domain filter corresponding to each space and/or each direction to use each beam. In other words, one spatial domain filter may correspond to one or more beams, and the UE or the BS may perform an operation such as LBT or transmission by using the spatial domain filter corresponding to a beam (or space and/or direction) to be used.

For example, the UE or the BS may perform LBT through the space and/or direction for the corresponding LBT beam by using the spatial domain filter corresponding to the LBT beam, or may perform DL/UL transmission through the space and/or direction for the corresponding Tx beam by using a spatial domain filter corresponding to the Tx beam.

A representative channel access procedure performed for transmission in an unlicensed band is listen-before-talk (LBT). This may be a mechanism for preventing collision between transmissions of corresponding signals when an interference level in a surrounding area measured by the BS and/or UE to transmit a signal is compared with a specific threshold such as an ED threshold and a noise level is equal to or less than a certain level.

Figure 14:
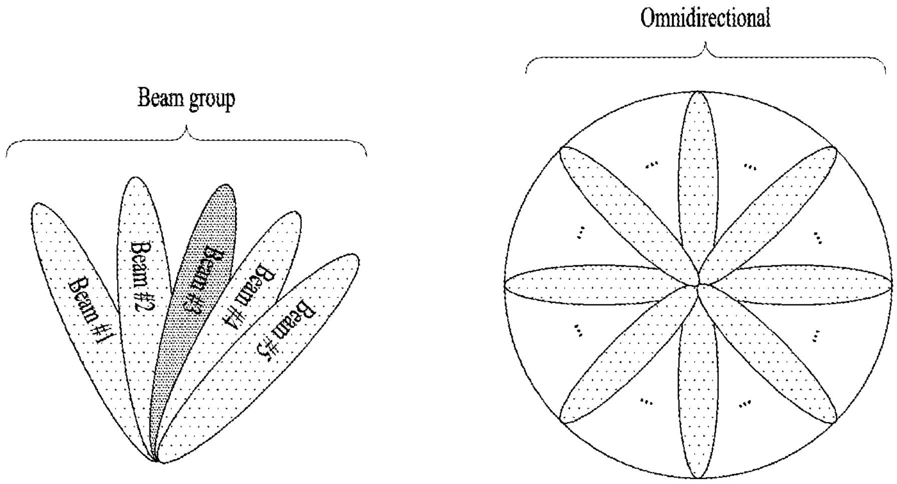
FIG. 14 is a diagram for explaining beam based listen-before-talk (LBT) and a beam group based LBT according to an Embodiment of the present disclosure.

FIG. 14 shows an example of directional LBT and omnidirectional LBT.

(a) of FIG. 14 shows a directional LBT including a specific beam direction LBT and/or a beam group unit LBT, and (b) of FIG. 14 shows an omnidirectional LBT.

In an existing NR-U system (e.g., Rel-16 NR-U), as described with reference to FIG. 9, a CAP (i.e., LBT) process is performed, and when a channel is determined to be IDLE, the DL/UL signal/channel is transmitted. In the existing NR-U system, an LBT band is matched with other RATs to ensure coexistence with other RATs (e.g., Wi-Fi), and the CAP (i.e., LBT) is performed in all directions. In other words, the non-directional LBT is performed in the existing NR-U system.

However, in Rel-17 NR-U for transmitting DL/UL signals/channels in a higher band (e.g., 52.6 GHz or higher band) than an unlicensed band of 7 GHz used in the existing NR-U system, directional LBT (D-LBT) for concentrating and transmitting energy in a a specific beam direction may be used to overcome a greater path loss than the existing band of 7 GHz. In other words, in Rel-17 NR-U, a path loss is reduced through D-LBT, allowing DL/UL signals/channels to be transmitted over wider coverage and also increasing efficiency for coexistence with other RATs (e.g., WiGig).

Referring to (a) of FIG. 14, when a beam group includes beams #1 to beam #5, performing LBT based on beams #1 to #5 may be referred to as a beam group unit LBT. Performing LBT through any one of beams #1 to #5 (e.g., beam #3) may be referred to as specific beam direction LBT. In this case, beams #1 to #5 may be continuous (or adjacent) beams, but may also be discontinuous (or non-adjacent)

beams. The number of beams included in a beam group may not necessarily need to be plural, and a single beam may form one beam group.

(b) of FIG. 14 shows omnidirectional LBT and it may be seen that the omnidirectional LBT is performed when one beam group is formed by omni-directional beams and the LBT is performed in units of corresponding beam groups. In other words, when beams in all directions, that is, omni-directional beams, which are a set of beams covering a specific sector in a cell, are included in one beam group, this may mean omnidirectional LBT.

In other words, in the case of a high frequency band, coverage may be limited due to a significant path-loss. To overcome this coverage problem, a multiple antenna scheme may be used. For example, narrow beam transmission, in which energy is concentrated in a specific direction (directionally) to transmit a signal rather than omnidirectional transmission, may be performed.

In a high-frequency unlicensed band, beam-based transmission needs to be combined and considered together with a channel access procedure such as the LBT described above. For example, to perform the directional LBT in a specific direction, transmission may be performed when a channel is determined to be idle by performing directional LBT (D-LBT) only in the corresponding direction or performing LBT in units of beam groups including a beam in the corresponding direction. Here, the beam group may include a single or multiple beams, and when the beam group includes an omni-directional beam, transmission may be expanded to omnidirectional LBT (O-LBT).

Therefore, the present disclosure proposes a method of configuring/indicating a beam (e.g., sensing beam) in which D-LBT is to be performed and a beam (e.g., Tx beam) in which transmission is to be performed before a BS transmits various UL signals/channels to be transmitted by a UE, to the UE. The present disclosure proposes a method of indicating whether the UE or the BS is capable of sharing a channel occupancy time (COT) and a cyclic prefix (CP) extension length according to Cat-2 LBT when the COT is shared.

The present disclosure proposes a method of measuring L3-received signal strength indicator (RSSI) by the UE or the BS.

Prior to explaining the proposed methods, the NR-based channel access scheme for an unlicensed band applied to the present disclosure may be classified as follows.

- Category 1 (Cat-1): Next transmission occurs immediately after a short switching gap immediately after previous transmission ends within the COT, and the switching gap is shorter than a certain length (e.g., 3 us), and a transceiver turnaround time is also included. The Cat-1 LBT may correspond to the type 2C CAP described above.
- Category 2 (Cat-2): LBT method without back-off, allowing immediate transmission when a channel is checked to be idle for a certain period of time immediately before transmission. The Cat-2 LBT may be subdivided according to the length of the minimum sensing section required for channel sensing immediately before transmission. For example, the Cat-2 LBT in which the length of the minimum sensing section is 25 us may correspond to the Type 2A CAP described above, and the Cat-2 LBT in which the length of the minimum sensing section is 16 us may correspond to the Type 2B CAP described above. The length of the minimum sensing section is exemplary, and may be shorter than 25 us or 16 us (e.g., 9 us).
- Category 3 (Cat-3): LBT method of back-off with a fixed CWS, in which a transmitting entity is capable of performing transmission when a counter value decreases and reaches 0 whenever a random number N is selected within a contention window size (CWS) value (fixed) from 0 to the maximum and a channel is checked to be idle.
- Category 4 (Cat-4): LBT method of back-off with variable CWS, in which a transmitting device is capable of performing transmission when a counter value decreases and reaches 0 whenever a random number N is selected within the maximum CWS value (varied) from 0 and a channel is checked to be idle and perform an LBT procedure again by increasing the maximum CWS value to a one level higher value and selecting a random number again within the increased CWS value when receiving feedback from a receiver side that the corresponding transmission is not properly received. The Cat-4 LBT may correspond to the type 1 CAP described above.

In the present disclosure, an LBT procedure for each beam or an LBT procedure for each beam group may basically mean Category-3 (Cat-3) or Category-4 LBT based on random back-off. The LBT for each beam is to perform carrier sensing in a specific beam direction and compares energy measured through the carrier sensing with an ED threshold, and then when the energy measured through carrier sensing is lower than the ED threshold, a channel in a corresponding beam direction is considered to be idle, and when the energy measured through carrier sensing is higher than the ED threshold, the channel in the corresponding direction is determined to be busy.

The beam group LBT procedure is to perform the LBT procedure described above in all beam directions included in the beam group and means that, when there is a beam in a specific direction (e.g., a representative beam) configured/indicated in advance within a beam group, a random back-off based LBT procedure is performed using the corresponding beam as a representative similarly to the multi-CC LBT and that the remaining beams included in the beam group are to perform Category-1 (Cat-1) or Category-2 (Cat-2) and signals are transmitted when the LBT is successful. In the beam group LBT procedure, according to the regulations of each country/region, a random back-off based LBT procedure is performed through the representative beam, the remaining beams included in the beam group are performed without performing LBT (no-LBT), and signals may also be transmitted through each of the remaining beams.

In an unlicensed band, a random-back off based LBT procedure may be performed using LBT parameters corresponding to a priority class of traffic to be transmitted before transmission. When a channel occupancy timer (COT) is obtained through the corresponding LBT procedure, transmission may be performed by multiple switching through Cat-1 or Cat-2 LBT depending on a gap between transmissions within a COT section. Here, the Cat-2 LBT needs to always be performed when a transmission direction is switched from DL to UL or from UL to DL within the COT and the gap length between transmissions is equal to or greater than Y. When a length (e.g., gap) between transmissions is less than or equal to or less than a specific length (e.g., Y), the Cat-1 LBT, which is capable of performing transmission without performing LBT, may be applied. Here, Y may mean a length of x us or a length of z OFDM symbols, and the corresponding x and/or z may be predefined or configured/indicated by the BS.

However, in a high-frequency unlicensed band equal to or greater than 52 GHz, the BS or the UE may perform LBT or beam group LBT in a specific beam direction (hereinafter referred to as directional LBT) as well as all-direction LBT (hereinafter referred to as omnidirectional LBT) as a channel access procedure and transmit DL or UL signals/channels. In the case of a COT acquired after performing LBT in a specific beam direction differently from a COT obtained after omnidirectional LBT, transmission may be allowed after the Cat-2 LBT only between DL and UL that have a correlation (e.g., QCL relationship) with a beam direction in which LBT is performed. In other words, for signals/channels that do not have a correlation with the beam direction in which LBT is performed, transmission may be performed after Random Back-off-based LBT (e.g., Cat-3 LBT or Cat-4 LBT) is performed again.

The Cat-2 LBT to be performed within a COT by a BS or a UE with a shared COT may be performed in all directions, or may also be performed in a beam direction that has a QCL relationship with a beam direction used to obtain the COT. When the UE receives a DL signal/channel in a specific beam direction or a beam group direction, only a search space (SS) that has a QCL relationship within the corresponding COT may be configured to be monitored.

Figure 15:
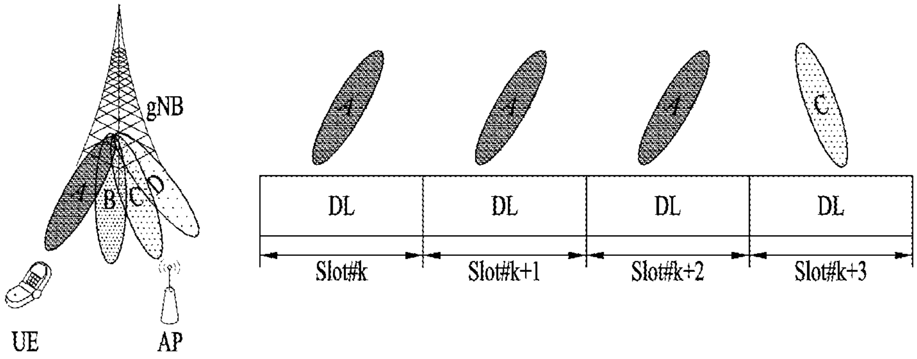
FIG. 15 is a diagram for explaining a problem in beam based LBT according to an Embodiment of the present disclosure.

All DL signals/channels (or UL signals/channels) included in one TX burst may be configured into signals/channels with spatial (partial) QCL relationships for the following reasons. For example, as shown in FIG. 15, when the BS transmits a TX burst including a total of 4 slots after successful LBT, the BS may transmit the TX burst in a beam direction A and then transmit the TX burst in a beam C direction in a $4^{th}$ slot.

However, while the BS transmits a signal in the beam direction A, a Wi-Fi AP coexisting in a corresponding U-band may not detect a signal transmitted in the beam direction A, and thus may determine a channel to be idle, may succeed in LBT, and start transmitting and receiving the signal. In this case, when the BS transmits a signal in the beam direction C starting from slot #k+3, this may interfere with a signal of a corresponding Wi-Fi signal. In this case, the BS transmitting the signal in the beam direction A may cause interference to other coexisting wireless nodes by changing the beam direction and transmitting the signal without additional LBT, and thus a transmission beam direction of a TX burst transmitted after the BS succeeds in LBT may not be changed.

In an NR system, a method of signaling beam information to be used by the UE during UL transmission and reception by associating a DL signal and a UL signal may be considered. For example, when there is a beam direction generated by the UE by associating a channel state information-reference signal (CSI-RS) resources and sounding reference signal (SRS) resources, the UE may transmit a UL signal by using a transmission beam corresponding to a CSI-RS reception beam while transmitting the SRS resource linked with the corresponding CSI-RS resource (or while transmitting a PUSCH scheduled through a UL grant signaled by an SRS resource linked to the corresponding CSI-RS resource). In this case, a relationship between a specific reception beam and a specific transmission beam may be configured by the UE in terms of implementation when the UE has beam correspondence capability. Alternatively, the relationship between a specific reception beam and a specific transmission beam may be established through training between the BS and the UE when the UE does not have beam correspondence capability.

Therefore, when an association relationship between a DL signal and a UL signal is defined, a COT may be allowed to be shared between a DL TX burst including DL signals/channels having a spatial (partial) QCL relationship with the corresponding DL signal and a UL TX burst including UL signals/channels having a spatial (partial) QCL relationship with a UL signal associated with the corresponding DL signal.

Here, the UL signal/channel may include at least one of the following signals/channels.

- SRS (sounding RS), DMRS for PUCCH, DMRS for PUSCH, PUCCH, PUSCH, and PRACH

Here, the DL signal/channel may include at least one of the following signals/channels.

- Primary synchronization signal (PSS), secondary SS (SSS), DMRS for PBCH, PBCH, tracking reference signal (TRS) or CSI-RS for tracking, CSI-RS for channel state information (CSI) acquisition and CSI-RS for RRM measurement, CSI-RS for beam management, DMRS for PDCCH, DMRS for PDSCH, PDCCH (or a control resource set (CORESET) for transmitting a PDCCH), PDSCH, and the listed signals, or modification of the signal or a newly introduced signal, that is, a signal located before the TX burst and introduced for the purpose of tracking or (fine) time/frequency synchronization or coexistence or power saving or frequency reuse factor=1

Each proposed method described below may be combined and applied together as long as the proposed method does not contradict other proposed methods.

As described above, in a high-frequency unlicensed band of 60 GHz, O-LBT in which a channel access procedure (e.g., LBT) and transmission are performed in all directions, D-LBT in which omni-directional transmission and LBT only in a specific beam direction, and directional transmission in a specific beam direction may be possible. Here, when the UE performs D-LBT and directional transmission in a specific beam direction to transmit a UL signal/channel, a direction in which the UE is to perform D-LBT (i.e., sensing beam direction) needs to be indicated/configured. A direction in which the UE is to perform directional transmission (i.e., Tx beam direction) needs to be indicated/configured. In this case, a method of indicating a direction of a sensing beam and a TX beam may differ depending on types of a UL signal and a channel.

When a gap between transmissions within a COT is equal to or greater than a certain length, there may be country/region regulations that require Cat-2 LBT for COT sharing. That is, in certain countries/regions, after the COT is acquired, transmission may always be continued during a COT section obtained without LBT (e.g., Maximum COT=5 ms) regardless of a length of a gap between transmissions, and in contrast, in certain other countries/regions, Cat-2 LBT may be required depending on the length of the gap between transmissions. Accordingly, as in LAA or NR-U, CP extension indication may be required when scheduling UL signals/channels.

However, depending on the capability of the UE, there may be UEs that are capable of performing Cat-2 LBT and UEs that are not capable of performing Cat-2 LBT. The BS is not capable of knowing whether the UE is capable of performing Cat-2 LBT during an initial connection process before the UE reports the capabilities thereof, and thus there may be a need for a method of interpreting a type of LBT indicated in a Channel Access-CPext field in Rel-16 NR-U and configuring a field.

As described above, sharing of COT obtained through D-LBT may be configured only with DL/UL signals/channels that have a correlation with a specific beam direction in which D-LBT is performed. When O-LBT is performed, COT sharing itself may not be allowed, and thus the BS or the UE may need to provide availability information of COT during DL-to-UL COT sharing or UL-to-DL COT sharing.

The COT availability refers to whether the UE or the BS is capable of sharing the COT acquired by the BS or the UE, and when it is possible to share the COT, the COT may be available. The UE or the BS that shares the COT may perform Cat-1 LBT or Cat-2 LBT instead of performing random back-off-based LBT (Cat-3 LBT or Cat-4 LBT) within the corresponding COT to transmit UL/DL signals. Through this, it may be possible to increase channel access opportunities within the shared COT and reduce latency for channel access.

Figure 16:
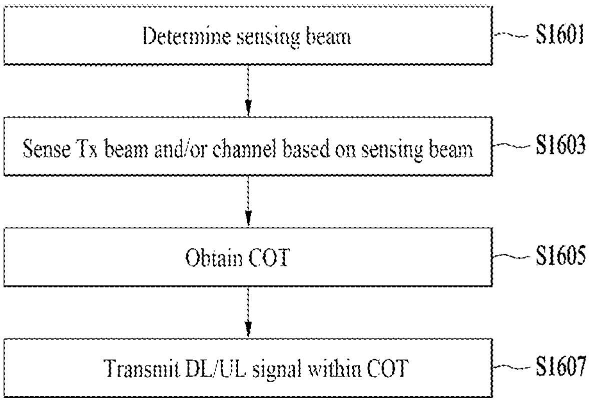
FIGS. 16 to 18 are diagrams for explaining the overall operation process of a UE and a BS according to an Embodiment of the present disclosure.
Figure 17:
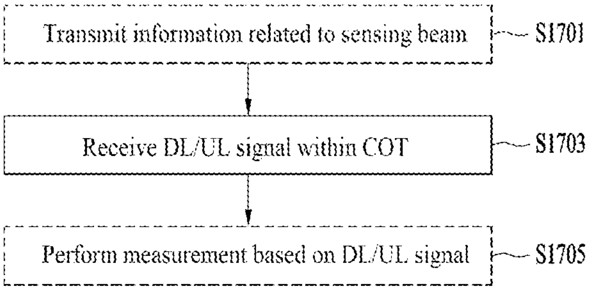

FIGS. 16 to 18 are diagrams for explaining the overall operation process of a UE and a BS according to an Embodiment of the present disclosure.

FIG. 16 shows the overall operation process of a transmitting end (e.g., UE or BS) by using the proposed methods according to the present disclosure. Referring to FIG. 16, a UE or a BS may determine a sensing beam for performing a channel access procedure (S1601). For example, the UE may determine the sensing beam based on information related to the sensing beam received from the BS, and the BS may determine the sensing beam itself.

A specific method for the UE or the BS to determine a sensing beam may be based on at least one of [Proposed Method #1], [Proposed Method #2], [Proposed Method #9], and [Proposed Method #10].

The UE or the BS may sense one or more Tx beams and/or one or more channels based on the sensing beam (S1603). When the COT is obtained through the corresponding sensing (S1605), the UE or the BS may transmit a DL/UL signal within the COT (S1607). The obtained COT may be shared with the BS or the UE, and whether the COT is capable of being shared may be indicated, and accordingly, a method for the UE or the BS to transmit DL/UL signals within the COT is based on at least one of [Proposed method #3], [Proposed method #4], [Proposed method #5], and [Proposed method #6].

FIG. 17 is a diagram for explaining the overall operation process of a receiving end (e.g., UE or BS) by using the proposed methods according to the present disclosure.

Referring to FIG. 17, when the receiving end is a BS, the BS may transmit information related to a sensing beam (S1701). When the receiving end is a UE, operation S1701 may be omitted. Information related to a sensing beam transmitted by the BS may be based on at least one of [Proposed Method #1], [Proposed Method #2], [Proposed Method #9], and [Proposed Method #10].

The UE or the BS may receive DL/UL signals within the COT (S1703). In this case, the UE or the BS may determine whether the COT is capable of being shared based on at least one of [Proposed Method #3], [Proposed Method #4], [Proposed Method #5], and [Proposed Method #6] and transmit DL/UL signals within a shared COT.

The UE or the BS may measure a received signal strength indicator (RSSI) based on the received DL/UL signal (S1705). For example, the UE or the BS may measure RSSI based on at least one of [Proposed Method #7] and [Proposed Method #8]. However, when the received DL/UL signal is not a reference signal (RS) for measurement, S1705 may be omitted.

FIG. 18 is a diagram for explaining the overall operation process of a transmitting end and a receiving end (e.g., UE or BS) by using the proposed methods according to the present disclosure. Referring to FIG. 18, when the receiving end is a BS, the BS may transmit information related to a sensing beam to the UE (S1801). When the receiving end is a UE, operation S1801 may be omitted. Information related to a sensing beam transmitted by the BS may be based on at least one of [Proposed Method #1], [Proposed Method #2], [Proposed Method #9], and [Proposed Method #10].

The UE or the BS may determine a sensing beam for performing a channel access procedure (S1803). For example, the UE may determine the sensing beam based on information related to the sensing beam received from the BS, and the BS may determine the sensing beam itself.

A specific method for the UE or the BS to determine a sensing beam may be based on at least one of [Proposed Method #1], [Proposed Method #2], [Proposed Method #9], and [Proposed Method #10].

The UE or the BS may sense one or more Tx beams and/or one or more channels based on the sensing beam (S1805). When the COT is obtained through the corresponding sensing (S1807), the UE or the BS may transmit a DL/UL signal within the COT (S1809). The obtained COT may be shared with the BS or the UE, and whether the COT is capable of being shared may be indicated, and accordingly, a method for the UE or the BS to transmit DL/UL signals within the COT is based on at least one of [Proposed method #3], [Proposed method #4], [Proposed method #5], and [Proposed method #6].

The UE or the BS may measure a received signal strength indicator (RSSI) based on the received DL/UL signal (S1811). For example, the UE or the BS may measure RSSI based on at least one of [Proposed Method #7] and [Proposed Method #8]. However, when the received DL/UL signal is not a reference signal (RS) for measurement, S1811 may be omitted.

[Proposed Method #1]

Method of configuring a sensing beam for each sounding reference signal (SRS) resource set or SRS resource when a resource is configured for SRS transmission 1. Embodiment #1-1

A sensing beam may be configured for each SRS resource set. For example, the same sensing beam may be applied to all SRS resources within the corresponding SRS resource set.

2. Embodiment #1-2

A sensing beam may be configured for each SRS resource group by grouping the SRS resources included in the SRS resource set. For example, the same sensing beam may be applied to all SRS resources within the SRS resource group.

3. Embodiment #1-3

A sensing beam may be configured for each SRS resource set.

[Embodiment #1-1] to [Embodiment #1-3] may be applied to SRS resource configuration for UL beam management.

To transmit an SRS in a specific beam direction in an unlicensed band, D-LBT in a specific beam direction or O-LBT performed in all directions may be required. Here, when performing D-LBT, a sensing beam direction in which D-LBT needs to be performed may be required before SRS transmission. Therefore, when resources for SRS transmission are configured, a sensing beam to be used in D-LBT for each SRS resource set or an SRS resource may be configured together.

A sensing beam may be configured for each SRS resource set. For example, when "SRS-SetUse" is configured to "BeamManagement", the sensing beam direction may be preset for each SRS resource set. In this case, the UE may perform D-LBT in a preset sensing beam direction before transmitting the corresponding SRS resource and transmit the SRS through the corresponding SRS resource. In this case, the same sensing beam may be applied to all SRS resources within the corresponding SRS resource set.

Alternatively, a sensing beam may be configured for each SRS resource group by grouping the SRS resources in the SRS resource set. In this case, the same sensing beam may be applied to SRS resources included in the same SRS resource group. Alternatively, a sensing beam may be configured for each separate SRS resource.

In this case, sensing beams may be configured considering a direction of a TX beam transmitting each SRS resource. In addition, per-beam LBT may be performed through multiple narrow separate sensing beams depending on the sensing beam, or LBT may be performed through single sensing beam covering multiple SRS Tx beam directions.

UL beam management may be used to determine a TX beam when beam correspondence of the UE is not maintained, may be used to refine an RX beam when the beam correspondence of the BS is not maintained, or may be used to determine a TX beam by the BS without reporting a preferred beam to the UE irrespective of the beam correspondence of the BS/UE.

In particular, to determine the TX beam of the UE, the BS may receive an SRS transmitted through UL TX beam sweeping of the UE in a state in which a specific RX beam is fixed and may indicate a beam to be used to transmit an SRS, a PUCCH, or a PUSCH through an SRS resource indicator (SRI). Therefore, [Proposed Method #1] may be be particularly useful when SRS resources are configured for UL beam management.

[Proposed Method #2]

Method of indicating TX beam and sensing beam for transmission of Dynamic Grant (DG)-PUSCH/Configured Grant (CG)-PUSCH and aperiodic transmission of SRS/PUCCH 1. Embodiment #2-1

Sensing beam information may be configured together when i) the Tx beam and the sensing beam is separately indicated, (ii) a state (index) in which the Tx beam and the sensing beam are combined (paired) is dynamically indicated, or (iii) a transmission configuration indication (TCI) state of a TX beam is configured, through a specific field in the DCI that schedules the DG-PUSCH.

2. Embodiment #2-2

Sensing beam information may be configured together when (i) a TX beam and a sensing beam of CG-PUSCH is separately indicated, (ii) a state (index) in which a TX beam and a sensing beam of the CG-PUSCH are combined (paired) is dynamically indicated, or (iii) a transmission configuration indication (TCI) state of the TX beam of the CG-PUSCH is configured, through activation downlink control information (DCI).

3. Embodiment #2-3

Sensing beam information may be configured together when (i) a Tx beam and a sensing beam is separately indicated, (ii) a state (index) in which a Tx beam and a sensing beam are combined (paired) is dynamically indicated, or (iii) a transmission configuration indication (TCI) state of a Tx beam is configured, through DCI (e.g., UL grant or DL assignment) for triggering an aperiodic SRS or PUCCH.

In the above, a state (index) in which a TX beam and a sensing beam are combined (paired) may be based on an entry preconfigured through a higher layer signal from the BS.

In the case of a dynamic grant (DG)-PUSCH that is dynamically scheduled through a UL grant, a direction of a sensing beam and a Tx beam used for DG-PUSCH transmission needs to be indicated before transmitting the DG-PUSCH. In the case of a Tx beam, it may be possible to indicate a direction of the Tx beam through an existing QCL/TCI framework, but the sensing beam for performing D-LBT may be different from the Tx beam. Accordingly, each of the Tx beam and the sensing beam may be separately indicated. Alternatively, a list including a plurality of combinations (pairs) of a TX beam and a sensing beam that are defined in one state by previously joint-encoding a Tx beam direction and a sensing beam direction may be preconfigured to the UE through a higher layer signal (e.g., RRC) and one of states configured through the UL grant may be dynamically indicated.

Alternatively, when the BS configures a TCI state of the Tx beam with a higher layer signal such as radio resource control (RRC), information about the sensing beam may be configured together, and the sensing beam may be indicated through the DCI.

The UE may perform D-LBT in a direction of a sensing beam corresponding to a state indicated through a specific field of the UL grant, and when the D-LBT is successful, the UE may directionally transmit a PUSCH in a direction of a Tx beam corresponding to the state. For example, state 0 may be configured to {TX beam X, LBT beam A} for each state of a field, state 1 may be configured to {TX beam Y, LBT beam B}, and one (e.g., state 0 or state 1) of states configured through DCI by the BS may be indicated. Here, an LBT beam may have the same meaning as a sensing beam.

There are Type 1 in which a configured grant (CG)-PUSCH is configured and activated only with RRC and Type 2 in which the CG-PUSCH is configured via RRC and activated through a combination of activation DCI. In this case, in the case of Type 2, the Tx beam and the sensing beam of the CG-PUSCH may be separately indicated through a specific field in the activation DCI, or a state (index) in which the Tx beam and the sensing beam of the CG-PUSCH are combined (paired) may be indicated dynamically. Like the DG-PUSCH, combinations of a plurality of Tx beams and sensing beams to be indicated by DCI may be preconfigured through a higher layer signal (e.g., RRC), when a specific combination is indicated from among the plurality of combinations through the DCI, the UE may perform D-LBT in the direction of the sensing beam indicated through activation DCI whenever CG-PUSCH is transmitted on the time-frequency resource for which a CG resource is configured, and when the D-LBT is successful, the CG-PUSCH may be transmitted directionally in the Tx beam direction.

In another method, when the BS configures a TCI state of a Tx beam with a higher layer signal such as RRC, information about the sensing beam may also be configured. For example, the Tx beam and the sensing beam may be configured together through a TCI state. When the BS indicates one of the TCI states configured through a higher layer signal via activation DCI, the UE may perform D-LBT through a sensing beam corresponding to the TCI state.

In the case of an aperiodic SRS or PUCCH triggered by DL assignment (e.g., DCI), D-LBT may also be performed in a sensing beam corresponding to a state indicated through a specific field in the DL assignment and PUSCH transmission may be directionally performed in a Tx beam direction corresponding to a state indicated when the corresponding D-LBT is successful or the corresponding sensing beam.

[Proposed Method #3]

Method of interpreting and configuring LBT type indicated by ChannelAccess-CPext field according to Cat-2 LBT capability of UE For example, [Proposed Method #3] may be applied when the UE transmits ACK/NACK for RAR grant/fallback DCI-based msg3 or msg4 before reporting capability.

1. Embodiment #3-1

When each state (index) indicated by ChannelAccess-CPext is read as a common value for all UEs, the Cat-2 LBT state (index) may be interpreted as random back-off based LBT (e.g., Cat-3 LBT or Cat-4 LBT). For example, regardless of whether the UE has Cat-2 LBT capability, even if a state corresponding to Cat-2 LBT is indicated to all UEs, random back-off based LBT (e.g., Cat-3 LBT or Cat-4 LBT) may be performed by the UE.

2. Embodiment #3-2

When each state (index) indicated by ChannelAccess-CPext is read as an independent value depending on UE capability, with regard to the same state (index) (e.g., state indicating Cat-2 LBT), a UE having Cat-2 LBT capability may interpret the state to be Cat-2 LBT and a UE without Cat-2 LBT capability may interpret the state to be random back-off based LBT (e.g., Cat-3 LBT or Cat-4 LBT).

3. Embodiment #3-3

When indirect information about regulations is to be obtained through a master information block (MIB) or system information block (SIB), a state (index) indicated through ChannelAccess-CPext is interpreted differently based on the information. For example, for each country/region, an indicated state (index) may be differently interpreted depending on (i) the case of a region in which LBT is not mandatory, (ii) the case in which LBT is mandatory but short control signaling exemption (SCSe) is applicable, (iii) the case of a region in which LBT is mandatory but Cat-2 LBT is not mandatory, or (iv) the case in which LBT is also mandatory and Cat-2 LBT is also mandatory.

(1) When LBT is not mandatory or SCSe is applicable even if LBT is mandatory, the state (index) indicated by the ChannelAccess-CPext field may be disregarded. Accordingly, the UE may perform transmission without performing LBT.

(2) In the case of a region in which LBT is mandatory but Cat-2 LBT is not mandatory, when a state (index) corresponding to Cat-2 LBT is indicated, the corresponding indication may be disregarded. Accordingly, the UE may not perform LBT or may perform random back-off based LBT (for example, Cat-3 LBT or Cat-4 LBT) and then perform transmission.

(3) When LBT is mandatory and Cat-2 LBT is also mandatory, [Embodiment #3-1] or [Embodiment #3-2] may be applied and an indicated state (index) may be interpreted differently.

In Rel-16 NR-U, there are a total of four types of channel access procedures (e.g., LBT Type 1/2A/2B/2C). Through a ChannelAccess-CPext field of fallback DCI format 0_0 and/or fallback DCI format 1_0, one of indexes obtained by combining a CP extension and a channel access procedure in Table 5 below may be indicated. In a band of 6 GHz in which NR-U operates, it is mandatory for all UEs to support all four LBT types above in terms of capability, but in a band of 60 GHz, Cat-2 LBT corresponding to LBT Type 2A/2B of NR-U may not be mandatory according to country/region regulations. Therefore, a UE that is capable of performing Cat-2 LBT and a UE that is not capable of performing Cat-2 LBT may be classified depending on the UE capability.

TABLE 5

| Bit field mapped to index | Channel Access Type | The CP extension T_"ext" index defined in Clause 5.3.1 of [4 TS 38.211] |
|---|---|---|
| 0 | Type2C-ULChannelAccess defined in [clause 4.2.1.2.3 in 37.213] | 2 |
| 1 | Type2A-UL ChannelAccess defined in [clause 4.2.1.2.1 in 37.213] | 3 |
| 2 | Type2A-UL ChannelAccess defined in [clause 4.2.1.2.1 in 37.213] | 1 |
| 3 | Type1-ULChannelAccess defined in [clause 4.2.1.1 in 37.213] | 0 |

However, like an initial access process, when the BS schedules the UE to transmit Msg3 PUSCH or ACK/NACK for Msg4 or MsgB before the UE reports capability to the BS, a method of configuring and interpreting an index indicated by a ChannelAccess-CPext field of a fallback DCI (e.g., DCI format 0_0 or DCI format 1_0) needs to be defined. For example, each state indicated by ChannelAccess-CPext may be interpreted differently depending on (i) the case in which the states are read to be a common value, (ii) the states are read independently for each UE, and/or (iii) a case in which indirect information for regulation of a country/region in which an NR-U system operates is obtained. Hereinafter, an interpreting method for each of the above-mentioned cases will be described in detail.

First, when each state (index) indicated by ChannelAccess-CPext is read as a common value for all UEs, the Cat-2 LBT state (index) may be interpreted as random back-off based LBT (e.g., Cat-3 LBT or Cat-4 LBT).

Here, a state (index) corresponding to Cat-2 LBT may refer to an LBT type of determining whether a channel is idle/busy by performing short channel sensing in an always fixed duration rather than a random back-off method within the COT like LBT Type 2A/2B of NR-U. In this case, there may be a difference in a gap length or sensing duration between transmissions that require Cat-2 LBT depending on a band or country/region regulations.

When each state (index) indicated by fallback DCI is commonly read by all UEs, a state corresponding to Cat-2 LBT may be indicated even to a UE without Cat-2 LBT capability, and thus the corresponding UE may be interpreted to be state (index) indicated to apply random back-off based LBT (for example, Cat-3 LBT or Cat-4 LBT) rather than LBT. For example, all UEs may perform random back-off based LBT (e.g., Cat-3 LBT or Cat-4 LBT) even if a state corresponding to Cat-2 LBT is indicated.

Second, when each state indicated by ChannelAccess-CPext is read as an independent value depending on Cat-2 LBT capability, the same state (index) (e.g., state indicating Cat-2 LBT) may be differently interpreted for each UE like in the case in which a UE having Cat-2 LBT capability configures Cat-2 LBT and a UE without Cat-2 LBT capability configures random back-off based LBT (e.g., Cat-3 LBT or Cat-4 LBT).

For example, even if a state corresponding to Cat-2 LBT is indicated in the same way, the UE with Cat-2 LBT capability may transmit a UL signal after performing Cat-2 LBT, and the UE without Cat-2 LBT capability may transmit a UL signal after performing random back-off based LBT (for example, Cat-3 LBT or Cat-4 LBT).

Third, a state indicated by a ChannelAccess-CPext field may be interpreted differently based on indirect information about regulations according to country/region.

For example, depending on a country/region, there are a region in which a spectrum sharing mechanism such as LBT needs to be implemented and a region in which a spectrum sharing mechanism needs not be implemented. When SCSe is applicable even in countries/regions in which LBT is mandatory, transmission may be possible without LBT. Depending on a length of a gap between transmissions within the COT, there may be countries/regions that require Cat-2 LBT and countries/regions that do not require Cat-2 LBT.

For example, for each country/region, (i) the case of a region in which LBT is not mandatory, (ii) the case in which LBT is mandatory but short control signaling exemption (SCSe) is applicable, (iii) the case of a region in which LBT is mandatory but Cat-2 LBT is not mandatory, or (iv) the case in which LBT is also mandatory and Cat-2 LBT is also mandatory may be classified. When the BS broadcasts information related to country/region regulations in a process of obtaining information necessary for the UE to access a cell, such as MIB or SIB, the UE may differently configure a Cat-2 LBT field based on the corresponding information.

For example, when LBT is not mandatory or SCSe is applicable even if LBT is mandatory, the state (index) indicated by the ChannelAccess-CPext field may be disregarded. Accordingly, the UE may perform transmission without performing LBT.

Alternatively, in the case of a region in which LBT is mandatory but Cat-2 LBT is not mandatory, when a state (index) corresponding to Cat-2 LBT is indicated, the corresponding indication may be disregarded. Accordingly, the UE may not perform LBT or may perform random back-off based LBT (for example, Cat-3 LBT or Cat-4 LBT) and then perform transmission.

When LBT is mandatory and Cat-2 LBT is also mandatory, [Embodiment #3-1] or [Embodiment #3-2] may be applied and an indicated state (index) may be interpreted differently.

[Proposed Method #4]

Method of providing information related to the availability of COT obtained according to a type of LBT performed by BS or UE 1. Embodiment #4-1

When the BS performs O-LBT for transmission of broadcast signals/channels such as a synchronization signal block (SSB), the BS may transmit information indicating that it is not possible to share a corresponding COT through group common-physical downlink (GC-PDCCH) or may always indicate only random back-off based LBT (for example, Cat-3 LBT or Cat-4 LBT) through UL grant or DL assignment.

2. Embodiment #4-2

When the UE performs O-LBT for CG-PUSCH transmission, the UE may indicate to the BS that COT sharing is not possible through CG-uplink control information (UCI).

In Rel-16 NR-U, the UE/BS may perform random back-off based LBT (e.g., Cat-3 LBT or Cat-4 LBT) with an LBT parameter of channel access priority class (CAPC) corresponding to data traffic, and when LBT is successful, the UE/BS may continuously perform transmission without additional random back-off based LBT (e.g., Cat-3 LBT or Cat-4 LBT) for a MCOT length defined for each CAPC. When the COT acquired by the UE/BS is transferred to the BS/UE and LBT of Type 2A/2B/2C corresponding to a gap length between DL-to-UL transmission or UL-to-DL transmission is performed, COT sharing is allowed to continue transmission while maintaining the COT. In this case, GC-PDCCH or CG-UCI may be used for the BS or the UE to inform each other whether the BS or the UE is capable of sharing a COT.

Likewise, in an NR system operating in a band of 60 GHz, when the UE or the BS performs random back-off-based LBT (e.g., Cat-3 LBT or Cat-4 LBT) and succeeds, a COT may be obtained, Cat-2 LBT may be performed without additional random back-off-based LBT (e.g., Cat-3 LBT or Cat-4 LBT) depending on a gap length and/or countries/regions within a MCOT length, and then continuous transmission may be performed.

However, as described above, unlike in a band of 6 GHz, in a band of 60 GHz, D-LBT and directional transmission using beamforming technology as well as omni-directional O-LBT may be possible. Therefore, whether COT sharing is possible may vary depending on which LBT is performed from among O-LBT and D-LBR.

When the BS performs O-LBT to transmit a broadcast signal/channel such as SSB, the BS may transmit information indicating that it is possible to share the corresponding COT to the UE through a GC-PDCCH. In other words, the BS indicates a state (index) corresponding to indicating that COT sharing is impossible through a field indicating the COT availability of time and frequency resources included in the GC-PDCCH, and thus the BS may indicate that it is not possible to share the corresponding time-frequency resource through the GC-PDCCH even if LBT is successful to obtain the COT.

Alternatively, the BS may always indicate only random back-off based LBT (e.g., Cat-3 LBT or Cat-4 LBT) through a UL grant for PUSCH transmission or DL assignment triggering PUCCH/SRS and may perform random back-off based LBT (e.g., Cat-3 LBT or Cat-4 LBT) again for UL transmission to instruct the UE to obtain a new COT.

When the UE performs O-LBT for CG-PUSCH transmission, the UE may indicate that it is not possible to share a COT through CG-UCI, to the BS. CG-UCI, which is multiplexed with CG-PUSCH and always transmitted together, may include a field that provides COT sharing information to the BS, and through the corresponding field, the UE may dynamically indicate one of a plurality of states (indexes) preset by the BS, to the BS. The corresponding state (index) may include CAPC information, offset, and/or duration information similar to cg-COT-SharingList-r16, but the configured state (index) may also include an entry indicating that COT sharing is not possible. When the UE performs O-LBT and COT sharing is not possible, the corresponding state (index) may be indicated to the BS.

UL data transmission such as a PUSCH may be indicated through DCI (e.g., UL grant) included in a PDCCH. The DCI contains information about a type of LBT and PUSCH starting position that the UE is to use when performing a channel access procedure. For example, in the existing LTE eLAA, the BS may indicate whether an LBT type to be used in the channel access procedure in a field configured with 1-bit within the UL grant DCI is a type 1 (e.g., Cat-4 LBT) or type 2 (e.g., 25 us Cat-2 LBT) and indicate one of {symbol #0, symbol #0+25 us, symbol #0+25 us+TA (timing advance), symbol #1} that are four possible PUSCH starting positions in a field configured with other 2-bits.

In NR, the BS may inform the UE of a location of the PUSCH starting symbol and the number of PUSCH symbols included in the PUSCH, which are time-domain resources of the PUSCH, through a start and length indicator value (SLIV) in the UL grant. That is, in the NR system, not all symbols constituting a slot are used for PUSCH transmission, but a PUSCH with a length corresponding to the number of PUSCH symbols is transmitted from the PUSCH starting symbol indicated by SLIV.

Therefore, previously, a starting position of the PUSCH is present between Symbol #0 and Symbol #1, but in NR, a starting point of a PUSCH may be present between starting symbol #K and symbol #K-N depending on a subcarrier spacing (SCS) and a gap based on a starting symbol #K indicated by SLIV. Here, the starting point of the PUSCH may mean a point in time when CPE for PUSCH transmission starts after the UE succeeds in LBT. In this case, the CPE may be located before the starting symbol of the corresponding PUSCH.

In an unlicensed band, when the BS instructs the UE to transmit a UL signal/channel (e.g., PUSCH, PUCCH, or SRS), a transmission start position according to a LBT gap (e.g., starting symbol of PUSCH/PUCCH/SRS) may be indicated, and when the UE performs LBT of a type indicated together through the corresponding UL grant and a point of time of succeeding in the LBT is before the indicated transmission start position, a channel duration may be filled with a cyclic prefix extension (CPE) and transmitted not to exceed a length of up to 1 orthogonal frequency division multiplexing (OFDM) based on a corresponding SCS to prevent other devices from occupying the channel duration between the point of time of succeeding in the LBT and the transmission start position.

When the CPE is indicated in consideration of an LBT type, a gap length, and timing advanced (TA) to be performed by the UE, a specific constant Cx may be preconfigured/indicated for each SCS, and the UE may calculate the length of a CPE to be filled by the UE based on the corresponding Cx. For reference, the supported CPE length to be located before PUSCH transmission in NR-U is shown in [Table 6] below.

TABLE 6

| |
|---|
| Agreement: |
| For the CP extension prior to at least a dynamically scheduled PUSCH transmission, the CP extension is located in the symbol(s) immediately preceding the PUSCH allocation indicated by SLIV. The supported durations for CP extension at the UE are: |
| 0 (i.e. no CP extension) |
| C1*symbol length-25 us |
| C2*symbol length-16 us-TA |
| C3*symbol length-25 us-TA |
| C1 = 1 for 15 and 30 kHz SCS, C1 = 2 for 60 kHz SCS |
| FFS: Whether C2/C3 is fixed or implicitly derived based on TA for each subcarrier spacing |
| The N2 timeline (UL grant to PUSCH delay) needs to be relaxed to take the CP extension into account |
| FFS: Whether the limit as per the previous agreement bounding the resulting CP extension to be less than or equal to one symbol for the given subcarrier spacing should be relaxed |
| FFS: Applicability of this to other UL transmissions |
| FFS: Whether the number of durations for CP extension that the UE can be signalled dynamically can be configured |

In a high frequency unlicensed band equal to or greater than 52 GHz, a length of a gap required for each LBT type may vary, but basically, the length of the CPE required for UL signal/channel transmission may be calculated using the same logic as described above. In a high frequency band, a much larger SCS may be supported than NR-U in a band equal to or less than 7 GHz for reasons such as phase noise, and according to the NR frame structure, a CP length becomes longer by 16*Ts may be increased for each 0.5 msec (e.g., symbol #0 and symbol #7 configured with 14 symbols). However, as a SCS becomes larger and a symbol length becomes shorter, a length of 16*Ts may become larger, correspond to approximately half of a duration of 1 OFDM symbol at 960 kHz, and have the same length as approximately 1 OFDM symbol duration at 1920 kHz. As such, when a CP of a symbol that returns with a cycle of 0.5 msec is referred to as a super large CP, a symbol length varies depending on a normal CP (NCP), an extended CP (ECP), and a super large CP (SCP), and thus Cx required to indicate the CPE may vary when indicating CPE.

[Table 7] shows an example of calculating a symbol length and the number of symbols required for the symbol length according to SCS and a CP type when a gap length for Cat-2 LBT is G1=8 us.

In the following description, a gap length required for Cat-2 LBT is represented by G1, and a value G1 may vary depending on country/region regulations. In other words, this is not limited to G1=8 us assumed in an example of [Table 7] above, and a value G1 may be determined according to country/region regulations.

TABLE 7

| SCS [kHz] | 60 | 120 | 240 | 480 | 960 | 1920 |
|---|---|---|---|---|---|---|
| | NCP | | | | | |
| Symbol duration | 16.7 us | 8.33 us | 4.17 us | 2.08 us | 1.04 us | 520 ns |
| CP length | 1.17 us | 586 ns | 293 ns | 146 ns | 73 ns | 36.5 ns |
| Total | 17.87 us | 8.92 us | 4.46 us | 2.23 us | 1.11 us | 557 ns |
| C1 value for Cat-2 (8 us) | 1 | 1 | 2 | 4 | 8 | 15 |
| | SCP | | | | | |
| Symbol index 0 or $7*2^{u}$ | 18.39 us | 9.44 us | 4.98 us | 2.75 us | 1.63 us | 1.078 us |
| C1 value for Cat-2 (8 us) | 1 | 1 | 2 | 4 | Nominal CP symbol 6 + super CP symbol 1 | Nominal CP symbol 13 + super CP symbol 1 |
| | ECP | | | | | |
| Symbol duration | 16.7 us | 8.33 us | 4.17 us | 2.08 us | 1.04 us | 520 ns |
| CP length | 4.17 us | 2.085 us | 1.043 us | 521 ns | 260 ns | 130 ns |
| Total | 20.87 us | 10.42 us | 5.21 us | 2.6 us | 1.3 us | 650 ns |
| C1 value for Cat-2 (8 us) | 1 | 1 | 2 | 4 | 7 | 13 |
| | SCP | | | | | |
| Symbol index 0 or $7*2^{u}$ | 21.39 us | 10.94 us | 5.73 us | 3.12 us | 1.82 us | 1.171 us |
| C1 value for Cat-2 (8 us) | 1 | 1 | 2 | Nominal CP symbol 2 + Super CP symbol 1 | Nominal CP symbol 5 + Super CP symbol 1 | Nominal CP symbol 11 + Super CP symbol 1 |

[Table 7] shows the result of calculating a C1 value required for each CP by using G1=8 us as an example when an LBT gap of G1 us is required to perform Cat-2 LBT in a band equal to or greater than 52.6 GHz based on a symbol duration and CP length for each SCS and a symbol length of 1 OFDM obtained by adding the symbol duration and the CP length in NCP/ECP.

A C1 value required for Cat-2 LBT is calculated by calculating the length of 1 OFDM symbol of the SCP that arrives every 0.5 ms for each NCP/ECP. First, there is no change in the C1 value of NCP or ECP between 60 kHz and 480 kHz. On the other hand, in an SCS of 960 kHz and 1920 kHz, NCP requires 8/15 symbols respectively, but a length of a symbol increases by 16*Ts, and thus SCP may satisfy a Cat-2 LBT gap of 8 us by using 7 and 13 symbols for Cat-2 LBT gap at G1=8 us.

Based on the calculation values shown in [Table 7] above, in [Proposed Method #5], a method of configuring the maximum gap length for transmission without LBT within the COT will be described.

[Proposed Method #5]

Method of configuring a value N differently depending on whether a long CP every 0.5 ms is included in a corresponding gap length Y when Cat-2 LBT needs to be performed if a maximum gap length Y between transmissions to which transmission is subsequent without additional LBT is given in N OFDM symbols and a gap length between transmissions is equal to or greater than Y

1. Embodiment #5-1

When an SCS value of the UE is equal to or greater than a certain value, a value N when a super CP symbol is included within a gap length Y (hereinafter, N1) may be configured to be less than a value N when the super CP is not included in the gap length Y (hereinafter, N2). For example, N1 may be configured to a value less than N2 by 1. In this case, X may be determined to be 960 kHz regardless of a CP length configuration. Alternatively, X may be determined differently depending on a CP length. For example, in the case of NCP, X=960 kHz may be determined, and in the case of ECP, X=480 kHz may be determined.

2. Embodiment #5-2

A value when a type of CP is ECP (hereinafter, N3) may be configured to be less than a value N when the type of CP is NCP (hereinafter, N4). For example, in the case of 960 kHz SCS, N3 may be configured to be 1 symbol less than N4, and in the case of 1920 kHz SCS, N3 may be configured to be 2 symbols less than N4.

In an NR-U system of a band of 6 GHz, when a gap between transmissions when sharing DL-to-UL COT or UL-to-DL COT is less than 25 us, when Cat-2 LBT (e.g., Type 2A LBT) may be performed and successful, transmission may continue up to MCOT while maintaining COT.

Similarly, in a band of 60 GHz, when a gap length between transmissions is equal to or less than a certain value Y, transmission may continue within an MCOT length without additional LBT, but when a gap length between transmissions is equal to or greater than Y, Cat-2 LBT of 8 us may be possible to perform transmission through COT sharing. In this case, a maximum gap length Y between transmissions within a COT may be configured/indicated by the BS as N OFDM symbols, and the value N may vary depending on whether a super CP (SCP) symbol is included in a specific SCS.

As described above, a length Y of the maximum gap may be determined depending on a type of CP (e.g., NCP and/or ECP) and whether or not an SCP is included. For example, assuming an LBT gap G1-8 us required for Cat-2 LBT as an example, a value N required for each SCS for NCP/ECP may be calculated as follows.

1) In the case of NCP+960 kHz, 8 symbols are required using only NCP symbols, but when SCP is included, a gap of G1=8 us may be satisfied with 6 NCP symbols and 1 super CP symbol.
2) In the case of NCP+1920 kHz, 15 symbols are required using only NCP symbols, but when SCP is included, a gap of G1=8 us may be satisfied with 13 NCP symbols and 1 SCP symbol.
3) In the case of ECP+960 kHz, 7 symbols are required using only NCP symbols, but when SCP is included, a gap of G1=8 us may be satisfied with 5 NCP symbols and 1 SCP symbol.
4) In the case of ECP+1920 kHz, 13 symbols are required using only NCP symbols, but when SCP is included, a gap of G1=8 us may be satisfied with 11 NCP symbols and 1 SCP symbol.
5) In the case of ECP+480 kHz, 4 symbols are required using only NCP symbols, but when SCP is included, a gap of G1=8 us may be satisfied with 2 NCP symbols and 1 SCP symbol.

When a gap G1=8 us is satisfied depending on whether a CP type is NCP or ECP regardless of whether SCP is included, N3 when the CP type is ECP may be configured to be 1 symbol less than N4 when the CP type is NCP in the case of SCS of 960 kHz, and may be configured to be 2 symbols less than N4 in the case of SCS of 1920 kHz.

As described above, in NR-U, C1/C2/C3 values are defined to indicate CPE for each gap length corresponding to the LBT type. A value C1 is unrelated to a value TA, and thus is defined as a fixed value for each SCS, and the values C2 and C3 are configured by the BS through RRC depending on the value TA for each UE, and the UE may determine values C2/C3 such that a length of the CPE does not exceed a symbol length of 1 OFDM before dedicated RRC configuration. Here, the values C2 and C3 may be configured through cp-ExtensionC2 and cp-ExtensionC3, which are RRC parameters defined in 3GPP TS 38.331, and a range of the values C2 and C3 may be determined according to the SCS as shown in [Table 8].

TABLE 8

| |
|---|
| For 15 and 30 kHz SCS, {1 . . . 28} are valid for both cp-ExtensionC2 and cp-ExtensionC3. For 30 kHz SCS, {1 . . . 28} are valid for cp-ExtensionC2 and {2 . . . 28} are valid for cp-ExtensionC3. For 60 kHz SCS, {2 . . . 28} are valid for cp-ExtensionC2 and {3 . . . 28} are valid for cp-ExtensionC3. |

In [Table 8], a maximum value is 28 regardless of SCS, but a minimum value varies depending on SCS. This is because a TA offset value defined for each operating frequency range is different, and considering an RX/TX turnaround time in TDD, the TA offset value is defined as 13 usec in FR1, and the TA offset value is defined as approximately 7 usec in in FR2. Therefore, even when TA=0, a minimum value of C2/C3 considering an OFDM symbol length for each SCS may be calculated by adding a TA offset value and a time (e.g., in NR-U, Type 2A LBT is defined as 25 us, and Type 2B LBT is defined as 16 us) required to perform LBT for each type.

[Proposed Method #6]

Minimum value of a value D2 required to indicate CPE considering OFDM symbol length for each SCS, TA offset value depending on operating band (e.g., frequency range), and a gap length required for Cat-2 LBT, and method of calculating the minimum value.

As described above, values D1/D2 may be defined as shown in [Table 9] to indicate a CPE length when performing Cat-2 LBT of 8 us even in NR in a band of 60 GHz of FR2-2.

Here, the values D1/D2 have the same concept as C1/C2/C3 for determining a CPE length in FR 1 and FR 2.

TABLE 9

| |
|---|
| 0 (i.e., no CP extension) |
| D1*symbol length-8 us |
| D2*symbol length-8 us-TA |
| D1 = 1 for 120 kHz SCS, D1 = 4 for 480 kHz SCS, D1 = 8 for 960 kHz SCS |

According to [Table 9], (i) "no CP extension" to indicate that CPE is not needed because CPE is not needed when transmission starts at an OFDM symbol boundary (ii) CPE indicated based on a value D1 configured regardless of a value TA to be applied during UL-to-UL transmission, and (iii) lengths of three types of CPEs indicated based on a value D2 considering a value TA for each UE.

Here, the value D1 is not related to the value TA, and thus may be defined as a fixed value for each SCS. The value D2 may be defined as an RRC parameter by calculating a minimum value based on a value obtained by adding an OFDM symbol length, a TA offset value, and 8 us required for Cat-2 LBT similarly to values C2/C3 of NR-U. That is, in a band of FR2-2, a TA offset value is approximately 7 us and an OFDM symbol length for each SCS of 120/480/960 kHz is defined in [Table 7], and thus considering this along with 8 us required for Cat-2 LBT, a minimum value of D2 depending on a symbol length for each SCS may be calculated as follows. In other words, the following minimum value is a value calculated using TA Offset 7 us+8 us=15 us and a symbol length for each SCS.

The following calculated values are calculated as a minimum integer value that makes the resulting value of D2*symbol length greater than 15. For example, in case 1), when the minimum integer value that makes the result of D2*8.92 greater than 15 is calculated, 2 may be obtained. However, when an SCP is included, the value may be calculated by considering a length of a symbol containing the corresponding SCP. Other SCSs may be calculated as follows when a minimum value of D2 is calculated in the above-described manner.

1) 120 kHz (OFDM symbol length=8.92 us): minimum value of D2=2

2) 480 kHz (OFDM symbol length=2.23 us): minimum value of D2=8 or 7

Here, when the minimum value of D2 is 7, one SCP symbol ((SCP OFDM symbol length=2.75 us) with 6 NCP symbols (NCP OFDM symbol length=2.23 us)+symbol index 0 or 7*2 u is included.

3) 960 kHz (OFDM symbol length=1.11 us): minimum value of D2=14

[Proposed Method #7]

Method of configuring reference SCS (hereinafter, 'ref-SCS') and measurement duration value for performing measurement for new SCS (e.g., 120/480/960 kHz)

ref-SCS may be defined only with 120 kHz, and the measurement duration may be maintained as {Jan. 14, 2028/42/70 symbols} irrespective of a SCS.

When measurement such as L3 RSSI measurement of the existing NR is performed, there is a reference SCS (i.e. ref-SCS) value, and for Rel-16 NR-U, the SCS is {15 kHz, 30 kHz, 60 kHz-NCP (normal CP), 60 kHz-ECP (extended CP)} inevitably. However, a new SCS of 120/480/960 kHz is considered in a band of 60 GHz, and thus a ref-SCS value needs to be added.

In the case of a measurement duration in which measurement is to be performed, the corresponding measurement duration value is counted based on the ref-SCS. For example, the measDuration-r16 value is {sym1, sym14 or sym12, sym28 or sym24, sym42 or sym36, sym70 or sym60}, which has a common value regardless of ref-SCS. In sym14 or 12, sym14 may mean 14 symbols for NCP, and sym12 may mean 12 symbols for ECP.

When ref-SCS is 120/480/960 kHz, the measurement duration may be determined using two methods. One method is to maintain {1/14/28/42/70 symbols} and the other method is to scale the measurement duration in an SCS-dependent manner. However, considering a band of 60 GHz (i.e., FR2-2) in which 1 symbol duration becomes excessively small, a scaling method may be more efficient.

For example, a method of defining ref-SCS as only 120 kHz and maintaining the measurement duration at 1/14/28/42/70 symbols may be considered. For example, despite a SCS BWP of 480 kHz, a measurement duration may be defined based on a SCS of 120 kHz. In this case, when ref-SCS is 120 kHz and the measurement duration is 1, a received signal strength indicator (RSSI) measurement may be performed for 4 symbols based on a SCS of 480 KHz.

[Proposed Method #8]

Method of configuring/performing measurement bandwidth in consideration of bandwidth/channel of other systems (e.g., WiGig) operating in the same band when NR L3 (Layer 3)-RSSI measurement is performed in a specific beam direction in a band of 60 GHz 1. Embodiment #8-1

Measurement may be performed for each bandwidth aligned with a channel/bandwidth of other systems (e.g., WiGig) operating in the same band.

2. Embodiment #8-2

The BS may indicate/configure a measurement bandwidth (BW) and measurement report to the UE in consideration of the channel/bandwidth of another system (e.g., WiGig) operating in the same band. For example, a bandwidth that overlaps with the bandwidth of other systems and a bandwidth that does not overlap may be distinguished therebetween, and measurement and reporting for each bandwidth may be indicated/configured. The UE may perform measurement for each bandwidth based on the corresponding indication/configuration and report the measurement results for each bandwidth.

3. Embodiment #8-3

The BS may configure, to the UE, only one of a bandwidth that overlaps a channel/bandwidth of another system (e.g., WiGig) operating in the same band and a bandwidth that does not overlap the channel/bandwidth, or the UE may select only one of the bandwidth that overlaps a channel/bandwidth of another system and the bandwidth that does not overlap the channel/bandwidth according to predefined or preset regulations. In this case, the predefined or preset regulations may be, for example, a larger bandwidth from among the bandwidth that overlaps a channel/bandwidth of another system and the bandwidth that does not overlap the channel/bandwidth or a bandwidth including SSB (bandwidth for transmitting SSB).

The UE may perform RSSI measurement within the corresponding bandwidth or perform RSSI measurement while reporting information about a bandwidth selected by the UE to the BS.

Figure 19:
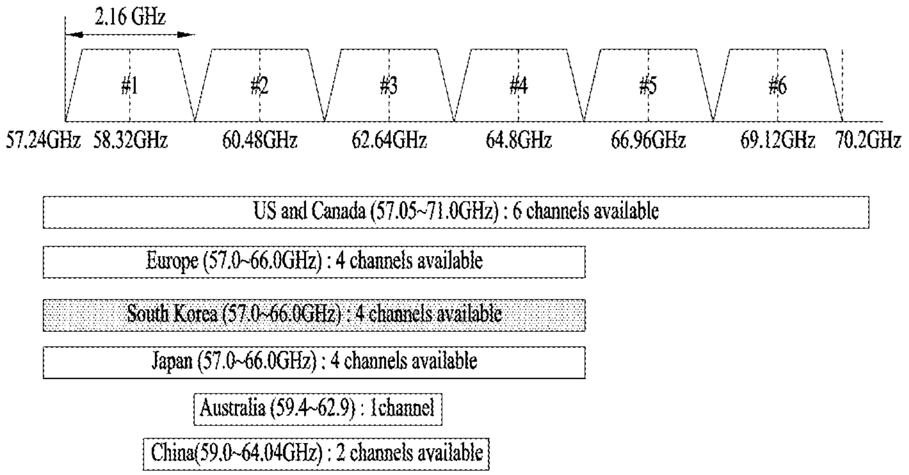
FIG. 19 is a diagram for explaining a measurement method in a band of 60 GHz according to an Embodiment of the present disclosure.

Currently, discussions are underway to support NR Rel-17 in a band of above 52.6 GHz and below 71 GHz. However, a WiGig (e.g., 802.11 ad/ay) system is deployed and used in a band of 60 GHz. In the case of WiGig, as shown in FIG. 19, channels having a channel bandwidth of 2.16 GHz are channelized and LBT and signal transmission/reception are performed in units of the corresponding channel bandwidth. However, in the case of WiGig, even if channel bandwidths are the same, the bandwidths and number of available channels may differ for respective countries.

In the case of an NR system in a band of 60 GHz, channelization like WiGig is not defined. Therefore, in a band of 60 GHz, LBT and signal transmission/reception may be performed in units of carrier or bandwidth part (BWP) sizes. According to the characteristics of a high frequency band, transmission/reception in a specific beam direction rather than omni-directional transmission/reception is considered, and thus L3-RSSI measurement may be performed through QCL type-D.

However, when L3-RSSI measurement is indicated/configured in a specific beam direction to the UE, a bandwidth for performing the corresponding measurement may overlap a channel/bandwidth of another system (e.g., WiGig) operating in the same band. There may be a difference in a degree of interference between a band that overlap with the channels/bandwidths of other systems and a band that does not overlap the channels/bandwidths.

For example, referring to FIG. 19, L3-RSSI measurement of 800 MHz may be indicated/configured to the UE, and a band of 200 MHz may overlap a bandwidth of a specific channel (e.g., #1) of WiGig and a band of the remaining 600 MHz band may not overlap with the corresponding specific channel (e.g., #1). In this case, a degree of interference in a band of 200 MHz that overlaps a channel/bandwidth of WiGig may be different from a degree of interference in a band of 600 MHz that does not overlap the channel/bandwidth.

Therefore, when the BS indicates/configures L3-RSSI measurement of 800 MHz or configures L3-RSSI measurement for an active BWP of 800 MHz, the UE may separately perform measurement for respective bands by distinguishing between a band of 200 MHz aligned with a WiGig channel (i.e., a band that overlaps a specific channel of another system) and a band of 600 MHz that does not overlap the specific channel. A degree of interference between bandwidths may be reported to the BS according to separately performed measurements.

Alternatively, the BS may separately indicate/configure a measurement BW and measurement report to the UE in consideration of the channel/bandwidth of another system (e.g., WiGig) operating in the same band. In this case, the measurement BW is divided into a bandwidth that overlaps with a band of another system and a bandwidth that does not overlap the band, and the BS may separately indicate/configure measurement and reporting for each of the overlapping and non-overlapping bandwidths. The UE may perform measurement for each bandwidth based on the corresponding indication/configuration and report a degree of interference for each bandwidth to the BS.

The BS may explicitly configure a bandwidth less than a band of an active BWP to the UE as a bandwidth for RSSI measurement. For example, the BS may configure, to the UE, one of a bandwidth that overlaps a channel/bandwidth of another system (e.g., WiGig) operating in the same band and a bandwidth that does not overlap the channel/bandwidth, or the UE may select only one of the bandwidth that overlaps a channel/bandwidth of another system and the bandwidth that does not overlap the channel/bandwidth according to predefined or preset regulations. In this case, the predefined or preset regulations may be, for example, a larger bandwidth from among the overlapping bandwidth and the non-overlapping bandwidth, or a bandwidth including an SSB (e.g., a bandwidth for transmitting the SSB).

The UE may perform RSSI measurement within the corresponding bandwidth or perform RSSI measurement while reporting information about the bandwidth selected by the UE to the BS.

For example, in the above-mentioned example, the BS may configure, to the UE, one of a band of 200 MHz that overlaps with the WiGig channel (hereinafter, BW1) and a band of 600 MHz that does not overlap (hereinafter, BW2). The UE may select only one of a bandwidth that overlaps a channel/bandwidth of another system and a bandwidth that does not overlap the channel/bandwidth according to regulations defined in the standard or promise preset by the BS (e.g., 600 MHz, which is a larger BW of the two BWs, or a BW that includes SSB from among the two). For example, the UE may select BW2 of 600 MHz, which has a larger bandwidth from among bandwidths that overlaps and does not overlap a channel/bandwidth of another system, or may select a band that includes SSB or in which SSB is transmitted from among BW1 and BW2. The UE may perform RSSI measurement within the corresponding bandwidth or perform RSSI measurement while reporting information about the bandwidth selected by the UE to the BS.

[Proposed Method #9]

Method of indicating sensing beam by using UL spatialrelationinfo and unified TCI framework 1. Embodiment #9-1

The BS may jointly encode a separate RS or wide beam LBT (for example, O-LBT) for sensing beam indication for each reference signal (RS) of UL spatialrelationinfo in advance.

(1) In the above, the fact that separate RSs are configured for each RS of UL spatialrelatioinfo means that the RS for LBT is configured separately for each UL signal/channel. For example, when a UL signal/channel is a PUCCH, an RS for LBT may be configured for each PUCCH-spatialRelationInfo-ID. When the UL signal/channel is DG-PUSCH/CG-PUSCH, the RS for LBT is configured according to each codepoint of an SRI field (e.g., a value of the SRI field), or RS for LBT of DG-PUSCH/CG-PUSCH may be configured to RRC. When the UL signal/channel is SRS, RS for LBT may be configured for each SRS resource or RS for LBT may be configured for each SRS resource set. Alternatively, RS for LBT may be configured through UL spatialRelationInfo set for each SRS resource/SRS resource set. Here, the RS for LBT is an RS for sensing beam configuration, and the UE may recognize this as indicating a sensing beam corresponding to the corresponding RS.

(2) The UE may configure a UL Tx beam direction based on an RS of the configured/indicated UL spatialrelationinfo. The sensing beam may be configured in a beam direction corresponding to a preset RS for LBT, and LBT may be performed using the corresponding sensing beam. Alternatively, the UE may always perform wide beam LBT (e.g., O-LBT) according to pre-configuration/indication of the BS or definition of the standard.

2. Embodiment #9-2

The BS may pre-configure an RS for separate LBT for sensing beam indication for each DL RS of a joint TCI state, to a UE supporting the Rel-17 unified TCI framework. In the case of DL/UL separate TCI, the BS may pre-configure (e.g., joint encoding) an RS for separate LBT for sensing beam indication for each UL RS of a UL TCI state, to the UE. Accordingly, the BS may indicate a UL Tx beam direction and sensing beam direction based on the configured RS for LBT, or always configure/indicate wide beam LBT (e.g. O-LBT) according to preconfiguration/indication of the BS or definition of the standard.

(1) Indication of a sensing beam by a joint TCI state or UL TCI state means that the RS for LBT is configured for each joint TCI state ID. That is, the RS for LBT may be configured/connected to each TCI state.

(2) When the BS indicates a joint TCI state or UL TCI state, the UE may perform LBT in a sensing beam direction corresponding to the RS for LBT preconfigured in the joint TCI state or the UL TCI state. Alternatively, the UE may always perform wide beam LBT (e.g., O-LBT) according to pre-configuration/indication or definition of the standard.

However, a method of separately indicating the sensing beam may be applied only to UEs of which beamCorrespondenceWithoutUL-BeamSweeping capability is {0} or beamCorrespondenceWithoutUL-BeamSweeping {0} before UL beam management.

To overcome a path-loss and ensure coverage in a high-frequency band, transmission/reception in a specific beam direction rather than in the omni-direction is considered using beamforming technology. Therefore, in an area in which a channel access mechanism such as LBT is mandatory as a spectrum sharing mechanism in an unlicensed band, when performing LBT, the use of a sensing beam in a specific beam direction rather than omni-direction may be considered. Therefore, the UE may need to indicate/configure a sensing beam to perform LBT, and thus there may be a method of indicating a UL Tx beam direction through UL spatialrelationinfo and indicating a sensing beam in consideration of a unified TCI framework.

According to whether a UE has beamCorrespondence-WithoutUL-BeamSweeping capability (BC capability), the UE may be classified into a UE having beam correspondence (BC) without beam sweeping (e.g., UL beam management procedure) and a UE that has BC without beam sweeping.

A UE that does not have beamCorrespondenceWithoutUL-BeamSweeping Capability may obtain BC through the UL beam management procedure. The BC may be obtained when 3 dB relaxed BC requirement is satisfied, but in this case, a penalty may need to be imposed on an energy detection (ED) threshold, which is a reference when performing LBT through a sensing beam. For example, LBT may be performed using the ED threshold that is 3 dB lower than the existing ED threshold.

When the UE has BC (i.e., when the UE having beam-CorrespondenceWithoutUL-BeamSweeping capability or has no capability but obtains the BC through UL beam management), the BS may indicate a sensing beam direction to be used in LBT based on DL RS (e.g., SSB or CSI-RS) configured to UL spatialrelationinfo using a QCL relationship or indicate an Rx beam corresponding to the corresponding UL Tx beam as a sensing beam based on a UL Tx beam indicated through the SRI. In this case, the UE may be expected to perform LBT by using the indicated sensing beam.

In the case of a UE that supports the Rel-17 unified TCI framework, the corresponding sensing beam direction may be indicated based on the DL RS indicated by the joint TCI state. In the case of DL/UL separate TCI, the UL Tx beam direction may be indicated through the UL TCI state.

That is, the BS may indicate the UL Tx beam to the UE through UL spatialrelationinfo and indicate the Rx beam direction corresponding to the Tx beam as a sensing beam direction. Alternatively, the BS may indicate a UL Tx beam to the UE that supports the unified TCI framework through a joint TCI state or UL TCI state indication and instruct the UE to use the Rx beam corresponding to the corresponding UL Tx beam direction as a sensing beam.

However, whether to apply a method of performing LBT in the sensing beam direction corresponding to the UL Tx beam direction may be changed depending on the BC capability of the UE. For example, the above-described sensing beam directing method may only be possible for a UE with beamCorrespondenceWithoutUL-BeamSweeping capability (i.e., BC capability).

There may be a need to indicate a separate sensing beam direction rather than an Rx beam direction corresponding UE having no BC capability (i.e., beamCorrespondence-WithoutUL-BeamSweeping capability is {0}) or a UE with BC capability={0} & before beam management.

The UE may transmit only in a single beam direction within the COT obtained by performing LBT, but may also receive scheduling of multiple UL transmissions transmitted in multiple beam directions. Here, a plurality of UL transmissions may be spatial domain multiplexing (SDM), which is transmitted simultaneously in a plurality of Tx beam directions, or time domain multiplexing (TDM), which is transmitted sequentially in time for each Tx beam direction. For transmission in multiple Tx beam directions, the UE may perform LBT through a single wide width beam (or omnidirectional beam) or multiple narrow sensing beams that cover each Tx beam direction.

In this case, in addition to indicating the sensing beam through joint TCI or DL/UL separate TCI using UL-spatialrelationinfo or unified TCI framework, the BS may need to additionally indicate/configure a separate sensing beam.

For example, when the three UL transmissions scheduled to the UE within the COT are in the Tx beam #A/#B/#C direction, the UE may start transmission only in succeeding in sequentially performing LBT through omni (quasi-omni) directional beam in a single wide width beam or all directions, which covers Tx beams #A/#B/#C or LBT for each beam with sensing beams #A/#B/#C corresponding to Tx beam #A/#B/#C, respectively. In this case, when the UE performs LBT through a single wide width beam or omnidirectional beam covering Tx beams #A/#B/#C, it may be more efficient to directly configure one sensing beam than to indicate the use of an Rx beam corresponding to each Tx beam as a sensing beam. When an Rx beam corresponding to each of the Tx beams #A/#B/#C does not cover the respective Tx beams or is not suitable for use as a sensing beam, it may be efficient to directly configure sensing beams for each of Tx beams #A/#B/#C. Even if the UE does not have beam correspondence capability and is not capable of determining or finding a sensing beam corresponding to the Tx beam autonomously, sensing beams corresponding to each Tx beam or all Tx beams may be directly configured.

Thus, a separate sensing beam may be indicated using UL spatialrelationinfo and unified TCI framework. For example, a sensing beam may be indicated by configuring a separate RS for LBT to a UL Tx beam separately from Rx beam indication corresponding to a Tx beam direction through a joint TCI state or UL TCI state (in the case of DL/UL separate TCI) by using the existing UL spatialrelationinfo or unified TCI framework. For example, when RS for LBT is jointly encoded with the UL Tx beam and the BS indicates one state through the joint TCI state or UL TCI state (in the case of DL/UL separate TCI), a Tx beam corresponding thereto and RS for LBT may be recognized by the UE, thereby directly indicating/configuring a sensing beam.

To this end, the BS may jointly encode a separate RS for indicating a sensing beam for each RS of UL spatialrelationinfo in advance or configure an RS to always perform wide beam LBT (e.g., O-LBT) to jointly encode the corresponding RS and the wide beam LBT. Here, the fact that separate RSs are configured for each RS of UL spatialrelatioinfo means that the RS for LBT is configured separately for each UL signal/channel. For example, the existing UL spatialRelationInfo may be set separately for PUCCH/PUSCH/SRS. For example, a PUCCH may be configured through PUCCH-spatialRelationInfo, PUSCH may be configured through SRI indication, and SRS may be configured through spatialRelationInfo for SRS. For example, when the UL signal/channel is a PUCCH, an RS for LBT may be configured for each PUCCH-spatialRelationInfo-ID. When the UL signal/channel is DG-PUSCH/CG-PUSCH, the RS for LBT may be configured according to each codepoint of an SRI field (e.g., a value of the SRI field). When the UL signal/channel is SRS, RS for LBT may be configured for each SRS resource or RS for LBT may be configured for each SRS resource set. Alternatively, the RS for LBT may be configured through UL spatialRelationInfo configured for each SRS resource/SRS resource set.

The UE may configure a UL Tx beam direction based on an RS of the configured/indicated UL spatialrelationinfo. The sensing beam may be configured in a beam direction corresponding to a preset RS for LBT, and wide beam LBT (e.g., O-LBT) may be performed.

When the DL/UL beam direction is indicated through a joint TCI state, the BS may jointly encode and configure a separate RS for LBT or wide beam LBT (e.g., O-LBT) for indicating a sensing beam for each DL RS of a joint TCI state. In the case of DL/UL separate TCI, the BS may join encode and configure an RS for separate LBT for sensing beam indication for each UL RS of a wide beam LBT (e.g., O-LBT) for each UL RS of a UL TCI state, to the UE.

Here, indication of a sensing beam by a joint TCI state or UL TCI state means that the RS for LBT is configured for each joint TCI state ID. That is, the RS for LBT may be configured/connected to each TCI state. The UE may configure the UL Tx beam direction based on the configured/indicated joint TCI state or UL TCI state and perform LBT in a sensing beam direction corresponding to the RS for LBT preconfigured in the joint TCI state or the UL TCI state or may perform wide beam LBT (e.g., O-LBT).

[Proposed Method #10]

Method of indicating separate sensing beam when UL spatialrelationinfo is not configured A sensing beam for LBT for each Tx beam may be separately configured or may be performed using wide beam LBT (e.g., O-LBT) by default. That is, the RS for LBT may be configured separately. For example, the sensing beam for LBT may be joint encoded for each Tx beam.

For example, the case in which UL spatialrelationinfo is not configured may mean the case in which a PUCCH is transmitted during an initial access process before UL spatialrelationinfo is configured, the case in which a PUSCH is scheduled through fallback DCI (e.g., DCI format 0_0) during the initial access process, or the case in which only one of SRS set resources in an SRS resource configured for beamManagement/beamswitching/positioning, an SRS resources for a codebook, or an SRS resource included in an SRS resource set for a non-codebook.

[Table 10] shows the description of 3GPP TS 38.214 Section 6.2.1.1. Referring to [Table 10], in the case of SRS resources included in the SRS resource set configured for beam management/non-codebook based/positioning, UL spatialrelationinfo may not be separately configured for the UE.

For example, in the case of SRS for beam management, UL spatialRelationInfo may not be configured for UL beam sweeping. In the case of non-codebook SRS, when associatedCSI-RS is configured for the SRS resource set, UL spatialRelationInfo may not be configured for the SRS resource linked to the SRS resource set. For example, one of associatedCSI-RS and UL spatialRelationInfo may be configured in an SRS resource set or an SRS resource included in the SRS resource set.

This is because, in the case of non-codebook SRS, a reference CSI-RS (e.g., associatedCSI-RS) may be configured for up to 4 SRS resources for the UE to determine a UL precoder, and thus a separate UL Tx beam indication is not needed, and the UE may transmit the non-codebook SRS through the Tx beam corresponding to the Rx beam used when receiving the corresponding CSI-RS. In this case, the BS may pre-configure a RS for LBT that is separate from the Tx beam and Rx beam, and the UE may perform LBT in a sensing beam direction corresponding to the pre-configured RS for LBT before performing transmission in the corresponding UL Tx beam direction.

As described above, as a separate sensing method when UL spatialrelationinfo is not configured, first, a sensing beam for LBT may be configured separately for each Tx beam. For example, the sensing beam for LBT may be joint encoded and configured for a Tx beam and LBT. That is, the RS for LBT may be configured separately. Second, when UL spatialrelatioininfo is not configured, it may be configured/indicated previously or defined in the standard to always perform wide beam LBT (e.g., O-LBT) by default. For example, the case in which UL spatialrelationinfo is not configured may mean the case in which a PUCCH is transmitted during an initial access process before UL spatialrelationinfo is configured, the case in which a PUSCH is scheduled through fallback DCI (e.g., DCI format 0_0) during the initial access process, or the case in which only one of SRS resources in an SRS resource set configured for beamManagement/beamswitching/positioning, an SRS resources for a codebook, or an SRS resource included in an SRS resource set for a non-codebook.

TABLE 10

| |
|---|
| When the higher layer parameter enableDefaultBeamPL-ForSRS is set 'enabled', and if the higher layer parameter spatialRelationInfo for the SRS resource, except for the SRS resource with the higher layer parameter usage in SRS-ResourceSet set to 'beamManagement' or for the SRS resource with the higher layer parameter usage in SRS-ResourceSet set to 'nonCodebook' with configuration of associatedCSI-RS or for the SRS resource configured by the higher layer parameter SRS-PosResourceSet, is not configured in FR2 and if the UE is not configured with higher layer parameter(s) pathlossReferenceRS, and if the UE is not configured with different values of coresetPoolIndex in ControlResourceSets, and is not provided at least one TCI codepoint mapped with two TCI states, the UE shall transmit the target SRS resource in an active UL BWP of a CC, |
| according to the spatial relation, if applicable, with a reference to the RS configured with qcl-Type set to 'typeD' corresponding to the QCL assumption of the CORESET with the lowest controlResourceSetId in the active DL BWP in the CC. |
| according to the spatial relation, if applicable, with a reference to the RS configured with qcl-Type set to 'typeD' in the activated TCI state with the lowest ID applicable to PDSCH in the active DL BWP of the CC if the UE is not configured with any CORESET in the active DL BWP of the CC |
| If the UE is not configured with the higher layer parameter spatialRelationInfoPos the UE may use a fixed spatial domain transmission filter for transmissions of the SRS configured by the higher layer parameter SRS-PosResource across multiple SRS resources or it may use a different spatial domain transmission filter across multiple SRS resources. |

When UL Spatialrelationinfo is not configured, the UE may use a fixed spatial domain transmission filter configured for an SRS resource or another spatial domain transmission filter across a plurality of SRS resources.

UL spatialrelationinfo may not be configured not only for SRS but also for UL signals/channels such as PUCCH/PUSCH. In this case, the BS may separately pre-configure the RS for LBT for a default UL Tx beam. The UE may perform LBT through the sensing beam corresponding to the RS for the LBT.

For example, in the case of fallback DCI (e.g., DCI format 0_0), the fallback DCI does not include the SRI field in the compact DCI format that schedules 1 port PUSCH, a default operation may be an operation in which the UE uses a Tx beam of a PUCCH resource with the lowest ID from among PUCCH resources activated with PUCCH-spatialRelationInfo for PUSCH transmission. In the case of a codebook or a non-codebook, the BS may basically indicate or switch through a higher layer signal (e.g., RRC) whether the corresponding transmission is Codebook based PUSCH transmission or non-codebook based PUSCH transmission. For example, the BS may indicate or switch whether a PUSCH is codebook-based through RRC IE TxConfig. In the case of S-TRP PUSCH rather than M-TRP PUSCH, only one SRS resource set for codebook or SRS resource set for non-codebook is configured.

The size of the SRI field may vary depending on the number of SRS resources for PUSCH Tx beam indication included in one SRS resource set. However, when there is only one SRS resource included in the corresponding SRS resource set, the SRI field is 0 bit. Therefore, in this case, there is only one SRS resource included in the SRS resource set, and thus the Tx beam of the corresponding SRS resource is indicated as the Tx beam for PUSCH transmission.

Therefore, in the case of a PUSCH scheduled with a fallback DCI, the UE may perform LBT through a sensing beam (e.g., sensing beam corresponding to a separate RS for LBT) related and preconfigured to a Tx beam corresponding to a PUCCH with the lowest ID from among PUCCH resources activated with PUCCH-spatialRelationInfo.

When only one SRS resource set for codebook or SRS resource set for non-codebook is configured, there is only one SRS resource contained within the SRS resource set, and thus LBT may be performed through a preset sensing beam (e.g., a sensing beam corresponding to a separate RS for LBT) associated with the Tx beam of the corresponding SRS resource.

In cases where the above-mentioned UL spatialrelationinfo is not configured, wide beam LBT (e.g., O-LBT) may be configured/indicated to always be performed by default, rather than sensing in a specific beam direction, or may be defined in the standard.

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 20:
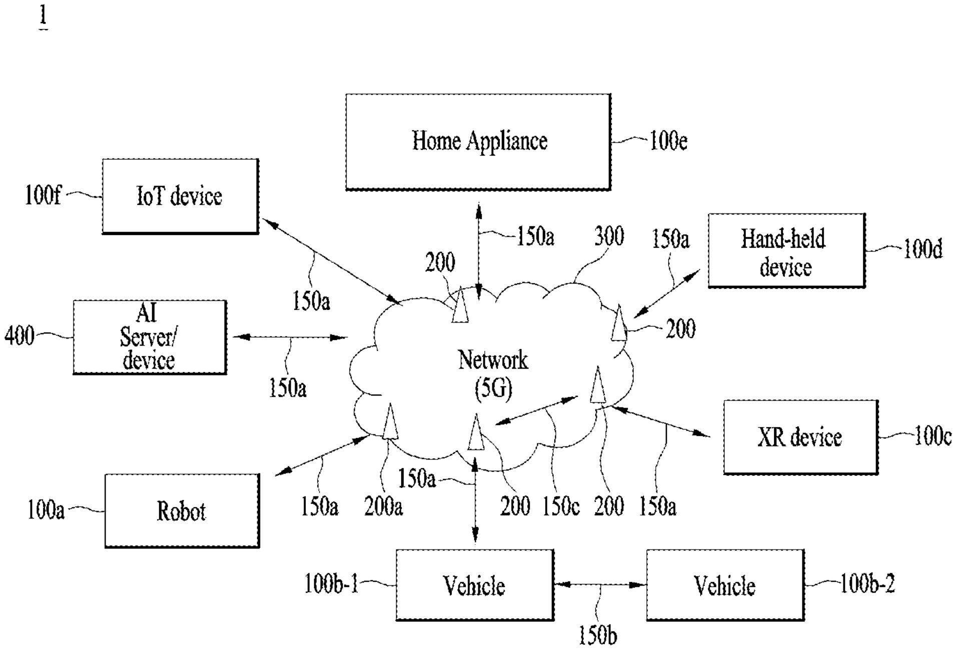
FIG. 20 illustrates a communication system applied to the present disclosure.

FIG. 20 illustrates a communication system 1 applied to the present disclosure.

Referring to FIG. 20, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100*a*, vehicles 100*b*-1 and 100*b*-2, an extended reality (XR) device 100*c*, a hand-held device 100*d*, a home appliance 100*e*, an IoT device 100*f*, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smartglasses), and a computer (e.g., a laptop). The home appliance may include a TV, a refrigerator, a washing machine, and so on. The IoT device may include a sensor, a smartmeter, and so on. For example, the BSs and the network may be implemented as wireless devices, and a specific wireless device 200*a* may operate as a BS/network node for other wireless devices.

The wireless devices 100*a* to 100*f* may be connected to the network 300 via the BSs 200. An AI technology may be applied to the wireless devices 100*a* to 100*f*, and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without intervention of the BSs/network. For example, the vehicles 100*b*-1 and 100*b*-2 may perform direct communication (e.g. V2V/vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, and 150*c* may be established between the wireless devices 100*a* to 100*f*/BS 200 and between the BSs 200. Herein, the wireless communication/connections may be established through various RATs (e.g., 5G NR) such as UL/DL communication 150*a*, sidelink communication 150*b* (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150*a*, 150*b*, and 150*c*. For example, signals may be transmitted and receive don various physical channels through the wireless communication/connections 150*a*, 150*b* and 150*c*. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 21:
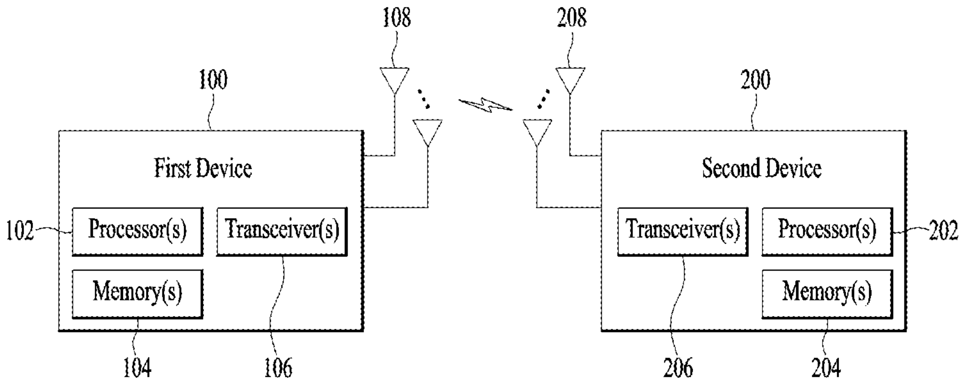
FIG. 21 illustrates wireless devices applicable to the present disclosure.

FIG. 21 illustrates wireless devices applicable to the present disclosure.

Referring to FIG. 21, a first wireless device 100 and a second wireless device 200 may transmit wireless signals through a variety of RATs (e.g., LTE and NR). {The first wireless device 100 and the second wireless device 200} may correspond to {the wireless device 100*x* and the BS 200} and/or {the wireless device 100*x* and the wireless device 100*x*} of FIG. 20.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

Specifically, instructions and/or operations, controlled by the processor 102 of the first wireless device 100 and stored in the memory 104 of the first wireless device 100, according to an Embodiment of the present disclosure will be described.

Although the following operations will be described based on a control operation of the processor 102 in terms of the processor 102, software code for performing such an operation may be stored in the memory 104. For example, in the present disclosure, the at least one memory 104 may be a computer-readable storage medium and may store instructions or programs. The instructions or programs may cause, when executed, the at least one processor operably connected to the at least one memory to perform operations according to Embodiments or implementations of the present disclosure, related to the following operations.

For example, the processor 102 may determine a sensing beam for performing a channel access procedure. For example, the processor 102 may determine the sensing beam based on information related to a sensing beam received from the BS.

A detailed method of determining a sensing beam by the processor 102 may be based on at least one of [Proposed Method #1], [Proposed Method #2], [Proposed Method #9], and [Proposed Method #10].

The processor 102 may sense one or more Tx beams and/or one or more channels based on the sensing beam. When obtaining a COT through corresponding sensing, the processor 102 may transmit a UL signal within the COT through the transceiver 106. The obtained COT may be shared by the BS, and whether the corresponding COT is shared may be indicated, and accordingly, a method of transmitting a DL signal within the COT by the BS may be based on at least one of [Proposed Method #3], [Proposed Method #4], [Proposed Method #5], and [Proposed Method #6].

As another example, the processor 102 may receive a DL signal within the COT through the transceiver 106. In this case, the processor 102 may determine whether the COT is shared based on at least one of [Proposed Method #3], [Proposed Method #4], [Proposed Method #5], and [Proposed Method #6] and may transmit a UL signal within the shared COT through the transceiver 106.

The processor 102 may also measure a received signal strength indicator (RSSI) based on the received DL signal. For example, the processor 102 may measure the RSSI based on at least one of [Proposed Method #7] and [Proposed Method #8]. However, when the received DL signal is not a reference signal (RS) for measurement, the corresponding measurement process may be omitted.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Specifically, instructions and/or operations, controlled by the processor 202 of the second wireless device 100 and stored in the memory 204 of the second wireless device 200, according to an Embodiment of the present disclosure will be described.

Although the following operations will be described based on a control operation of the processor 202 in terms of the processor 202, software code for performing such an operation may be stored in the memory 204. For example, in the present disclosure, the at least one memory 204 may be a computer-readable storage medium and may store instructions or programs. The instructions or programs may cause, when executed, the at least one processor operably connected to the at least one memory to perform operations according to Embodiments or implementations of the present disclosure, related to the following operations.

For example, the processor 202 may determine a sensing beam for performing a channel access procedure. For example, the processor 202 may autonomously determine the sensing beam.

A detailed method of determining a sensing beam by the processor 202 may be based on at least one of [Proposed Method #1], [Proposed Method #2], [Proposed Method #9], and [Proposed Method #10].

The processor 202 may sense one or more Tx beams and/or one or more channels based on the sensing beam. When obtaining a COT through corresponding sensing, the processor 202 may transmit a UL signal within the COT through the transceiver 206. The obtained COT may be shared by the BS, and whether the corresponding COT is shared may be indicated, and accordingly, a method of transmitting a DL signal within the COT by the BS may be based on at least one of [Proposed Method #3], [Proposed Method #4], [Proposed Method #5], and [Proposed Method #6].

As another example, the processor 202 may transmit information related to the sensing beam through the transceiver 206. The information related to the sensing beam transmitted by the processor 202 may be based on at least one of [Proposed Method #1], [Proposed Method #2], [Proposed Method #9], and [Proposed Method #10].

The processor 202 may receive a UL signal within the COT through the transceiver 206. In this case, the processor 202 may determine whether the COT is shared based on at least one of [Proposed Method #3], [Proposed Method #4], [Proposed Method #5], and [Proposed Method #6] and may transmit a DL signal within the shared COT through the transceiver 206.

The processor 202 may also measure an RSSI based on the received UL signal. For example, the processor 202 may measure the RSSI based on at least one of [Proposed Method #7] and [Proposed Method #8]. However, when the received UL signal is not an RS for measurement, the corresponding measurement process may be omitted.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/ channels processed using the one or more processors 102 and 202 from the baseband signals into the RF band signals. To this end, the one or more transceivers 106 and 206 may include (analog) oscillators and/or filters.

Figure 22:
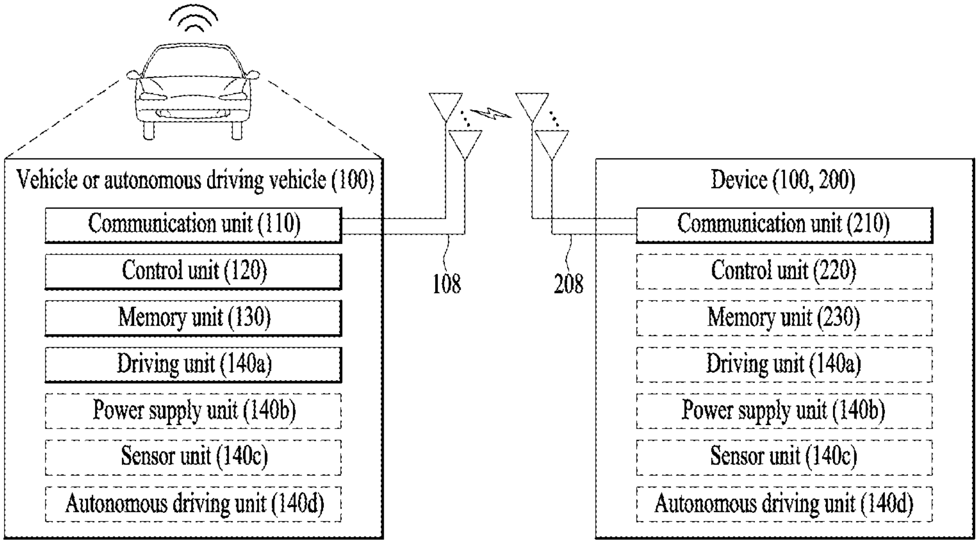
FIG. 22 illustrates a vehicle or an autonomous driving vehicle applied to the present disclosure.

FIG. 22 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 22, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140*a* may enable the vehicle or the autonomous driving vehicle 100 to drive on a road. The driving unit 140*a* may include an engine, a motor, a powertrain, a wheel, a brake, a steering device, and so on. The power supply unit 140*b* may supply power to the vehicle or the autonomous driving vehicle 100 and include a wired/wireless charging circuit, a battery, and so on. The sensor unit 140*c* may acquire information about a vehicle state, ambient environment information, user information, and so on. The sensor unit 140*c* may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140*d* may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140*d* may generate an autonomous driving route and a driving plan from the obtained data. The control unit 120 may control the driving unit 140*a* such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140*c* may obtain information about a vehicle state and/or surrounding environment information. The autonomous driving unit 140*d* may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

The Embodiments of the present disclosure described herein below are combinations of elements and features of the present disclosure. The elements or features may be considered selective unless otherwise mentioned. Each element or feature may be practiced without being combined with other elements or features. Further, an Embodiment of the present disclosure may be constructed by combining parts of the elements and/or features. Operation orders described in Embodiments of the present disclosure may be rearranged. Some constructions of any one Embodiment may be included in another Embodiment and may be replaced with corresponding constructions of another Embodiment. It will be obvious to those skilled in the art that claims that are not explicitly cited in each other in the appended claims may be presented in combination as an Embodiment of the present disclosure or included as a new claim by a subsequent amendment after the application is filed.

In the present disclosure, a specific operation described as performed by the BS may be performed by an upper node of the BS in some cases. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc.

Those skilled in the art will appreciate that the present disclosure may be carried out in other specific ways than those set forth herein without departing from the spirit and essential characteristics of the present disclosure. The above Embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

While the above-described method of performing channel access procedure and an apparatus therefor have been described based on an example applied to a 5G NR system, the method and apparatus are applicable to various wireless communication systems in addition to the 5G NR system.

The invention claimed is:

1. A method performed by a user equipment (UE), the method comprising:
- receiving information about a downlink reference signal related to an uplink signal;
- based on the received information, obtaining spatial relation information between the downlink reference signal and the uplink signal;
- determining a transmission beam and a sensing beam for the uplink signal based on the spatial relation information;
- performing sensing on the sensing beam; and
- based on a channel, corresponding to the sensing beam, being idle, transmitting the uplink signal via the transmission beam.

2. The method of claim 1, wherein the information includes a unified transmission configuration indicator (TCI) framework.

3. The method of claim 1, wherein the determining of the sensing beam includes:

determining an uplink reference signal used for listen-before-talk (LBT) based on the spatial relation information; and determining the sensing beam based on the uplink reference signal.

4. The method of claim 1, wherein the UE has no beam correspondence.

5. The method of claim 1, wherein the sensing beam covers the transmission beam.

6. A user equipment (UE) comprising:

at least one transceiver;

at least one processor; and at least one computer memory operatively connected to the at least one processor and configured to store instructions that when executed causes the at least one processor to perform operations including:

receiving information about a downlink reference signal related to an uplink signal through the at least one transceiver;

based on the received information, obtaining spatial relation information between the downlink reference signal and the uplink signal;

determining a transmission beam and a sensing beam for the uplink signal based on the spatial relation information;

performing sensing on the sensing beam; and based on a channel, corresponding to the sensing beam, being idle, transmitting the uplink signal via the transmission beam through the at least one transceiver.

7. The UE of claim 6, wherein the information includes a unified transmission configuration indicator (TCI) framework.

8. The UE of claim 6, wherein the determining of the sensing beam includes:

determining an uplink reference signal used for listen-before-talk (LBT) based on the spatial relation information; and determining the sensing beam based on the uplink reference signal.

9. The UE of claim 6, wherein the UE has no beam correspondence.

10. The UE of claim 6, wherein the sensing beam covers the transmission beam.

11. An apparatus comprising:

at least one processor; and at least one computer memory operatively connected to the at least one processor and configured to store instructions that when executed causes the at least one processor to perform operations including:

receiving information about a downlink reference signal related to an uplink signal;

based on the received information, obtaining spatial relation information between the downlink reference signal and the uplink signal;

determining a transmission beam and a sensing beam for the uplink signal based on the spatial relation information;

performing sensing on the sensing beam; and based on a channel, corresponding to the sensing beam, being idle, transmitting the uplink signal via the transmission beam.

12. A computer-readable storage medium including at least one computer program for causing at least one processor to perform operations comprising:

receiving information about a downlink reference signal related to an uplink signal;

based on the received information, obtaining spatial relation information between the downlink reference signal and the uplink signal;

determining a transmission beam and a sensing beam for the uplink signal based on the spatial relation information;

performing sensing on the sensing beam; and based on a channel, corresponding to the sensing beam, being idle, transmitting the uplink signal via the transmission beam.

* * * * *